(12) United States Patent
Liu et al.

(10) Patent No.: US 11,105,234 B2
(45) Date of Patent: Aug. 31, 2021

(54) PARTICULATE FILTERS

(71) Applicant: Ford Global Technologies, LLC, Dearborn, MI (US)

(72) Inventors: Xin Liu, Novi, MI (US); Joseph Szente, Ypsilanti, MI (US); Christine Kay Lambert, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 331 days.

(21) Appl. No.: 16/021,254

(22) Filed: Jun. 28, 2018

(65) Prior Publication Data

US 2019/0048771 A1 Feb. 14, 2019

Related U.S. Application Data

(60) Provisional application No. 62/544,503, filed on Aug. 11, 2017.

(51) Int. Cl.
*B01D 39/20* (2006.01)
*F01N 3/022* (2006.01)
(Continued)

(52) U.S. Cl.
CPC ......... *F01N 3/022* (2013.01); *B01D 39/2031* (2013.01); *B01D 39/2072* (2013.01); *B01D 46/0027* (2013.01); *B01D 46/2429* (2013.01); *F01N 3/0222* (2013.01); *F01N 3/033* (2013.01); *B01D 53/94* (2013.01); *B01D 53/944* (2013.01); *B01D 2046/2433* (2013.01); *B01D 2255/9155* (2013.01); *B01D 2255/92* (2013.01); *B01D 2275/30* (2013.01); *B01D 2275/40* (2013.01);
(Continued)

(58) Field of Classification Search
CPC ............ B01D 39/2031; B01D 46/2429; B01D 46/0027; B01D 39/2072; B01D 2046/2433; B01D 53/944; B01D 53/94; B01D 2255/9155; B01D 2255/92; B01D 2255/30; B01D 2255/40; B82Y 30/00; F01N 3/022; F01N 3/0222; F01N 2330/08; F01N 2330/30; F01N 3/035
USPC .................. 55/385.3, 523, DIG. 30; 60/297; 423/212; 428/116
See application file for complete search history.

(56) References Cited

U.S. PATENT DOCUMENTS 8,241,579 B2 8/2012 Chigapov et al.
8,632,852 B2 1/2014 Tsuji et al.
(Continued)

FOREIGN PATENT DOCUMENTS

| EP | 1775021 | 6/2007 |
| KR | 20140065367 A | 5/2014 |
| WO | WO2017056067 A1 | 4/2017 |

OTHER PUBLICATIONS

Lambert, Christine, et al. "Gasoline Particle Filter Development." Emission Control Science and Technology 3.1 (2017): 105-111.
(Continued)

*Primary Examiner* — Minh Chau T Pham
(74) *Attorney, Agent, or Firm* — Vincent Mastrogiacomo; Brooks Kushman P.C.

(57) ABSTRACT

The disclosure generally relates to filters, methods, and systems for filtering particulates from the exhaust of internal combustion engines such as gasoline direct injection engines and methods of preparing particulate filters.

14 Claims, 31 Drawing Sheets

(51) Int. Cl.
    *B01D 46/00*    (2006.01)
    *F01N 3/033*    (2006.01)
    *B01D 46/24*    (2006.01)
    *B01D 53/94*    (2006.01)
    *B82Y 30/00*    (2011.01)

(52) U.S. Cl.
    CPC ........... *B82Y 30/00* (2013.01); *F01N 2330/06* (2013.01); *F01N 2330/30* (2013.01)

(56) References Cited

U.S. PATENT DOCUMENTS

| | | | |
|---|---|---|---|
| 9,321,694 | B2 | 4/2016 | Pyzik et al. |
| 9,376,347 | B2 | 6/2016 | Backhaus-Ricoult et al. |
| 2004/0176246 | A1 | 9/2004 | Shirk et al. |
| 2007/0140928 | A1 | 6/2007 | Beall et al. |
| 2008/0317999 | A1* | 12/2008 | Patchett ............... F01N 3/2828 428/116 |
| 2009/0193796 | A1* | 8/2009 | Wei ..................... F01N 13/011 60/297 |
| 2010/0170230 | A1* | 7/2010 | Chiffey .................. B01J 23/42 60/297 |
| 2011/0158871 | A1* | 6/2011 | Arnold .................. B01J 29/082 423/212 |
| 2014/0301924 | A1* | 10/2014 | Morgan ............. B01D 53/9454 423/212 |
| 2014/0322113 | A1* | 10/2014 | Blakeman ............. B01J 35/006 423/212 |
| 2018/0008973 | A1* | 1/2018 | Gramiccioni ............ B01J 35/10 |
| 2018/0021768 | A1* | 1/2018 | Chandler ............... B01J 37/038 502/66 |
| 2018/0353905 | A1* | 12/2018 | Li ...................... B01D 46/2459 |
| 2019/0168161 | A1* | 6/2019 | Cravillon .............. B01D 53/945 |
| 2020/0191030 | A1* | 6/2020 | Clowes .................. F01N 3/0226 |

OTHER PUBLICATIONS

Zuberi, Bilal, et al. Advanced High Porosity Ceramic Honeycomb Wall Flow Filters. No. 2008-01-0623. SAE Technical Paper, 2008.

\* cited by examiner

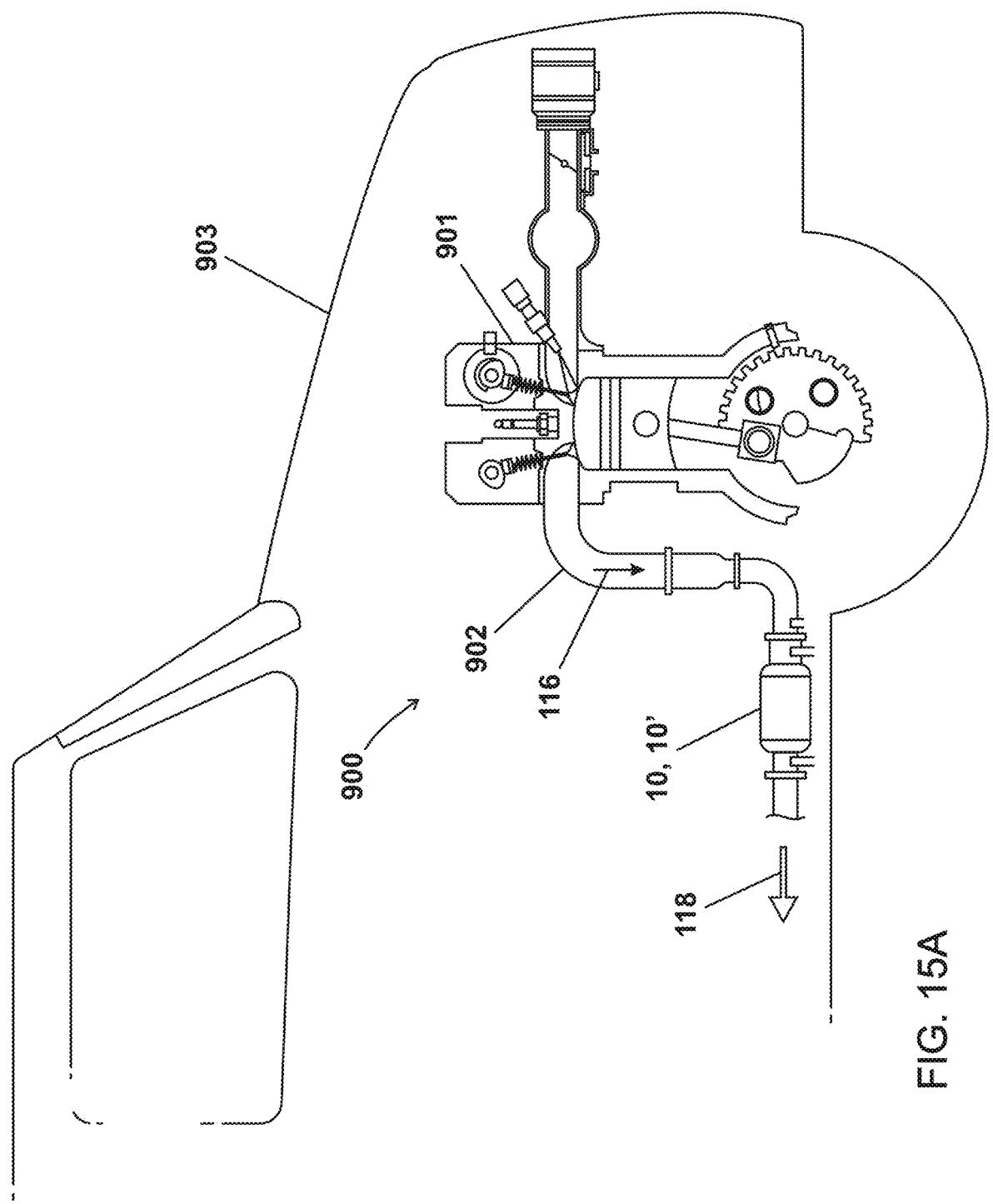

PARTICULATE FILTERS

CROSS-REFERENCE TO RELATED APPLICATIONS

This application claims the benefit of U.S. Provisional Application Ser. No. 62/544,503 filed 11 Aug. 2017, the disclosure of which is hereby incorporated in its entirety by reference herein.

TECHNICAL FIELD

The disclosure generally relates to filters, methods, and systems for filtering particulates from the exhaust of internal combustion engines such as gasoline direct injection engines and methods of preparing particulate filters.

BACKGROUND

High green filtration efficiencies (>80%) for particulate filters will be greatly needed with the more stringent particulate emission standards such as EU6 ($6 \times 10^{11}$ particles/km). To this extent, gasoline internal combustion engines such as gasoline direct injection (GDI) engines can emit more than ten times the amount of hazardous fine particulate matter than a port fuel-injected engine (PFI), especially during a cold start. Current gasoline particulate filter (GPF) technology typically involves ceramic filter substrates with or without catalytic washcoats. Alternative technologies include metallic fibers and foams. At low mileage, before any material has been collected in the filter, the filtration efficiency is at its lowest level. The filtration efficiency generally improves as soot and non-combustible ash are collected. Several techniques have been used to improve the filtration efficiency of filter substrates in their fresh state including changing the geometric volume (diameter and length), cell density, wall thickness, pore size, size distribution, and/or porosity of the filter substrates, and in the case of metallic filters, the fiber or particle size. However, higher efficiencies achieved by these means typically result in higher backpressure penalties, and there is often limited space on the vehicle that dictates the overall filter size. Higher washcoat loading is considered as another way of improving filtration efficiency. In this technique, a ceramic powder based suspension is prepared to coat a substrate filter at a loading range of a few grams per cubic inch. This technique still results in higher backpressure penalties with limited improvement in particulate filtration efficiencies. Further, the washcoat technique is still being optimized to balance the limited filtration efficiency improvement with low washcoat loadings and high backpressure penalties at high washcoat loadings.

SUMMARY

The disclosure generally relates to filters, methods, and systems for filtering particulates from the exhaust of internal combustion engines such as GDI engines and methods of preparing particulate filters.

In various embodiments are disclosed engine exhaust particulate filters including a porous substrate having thereon inert nanoparticles at a concentration ranging from 0.01 g/L to 60 g/L relative to a filter volume of the substrate, a portion of the nanoparticles arranged to form regeneration resistant porous structures configured to capture particulates from an exhaust gas stream.

In various embodiments are disclosed engine exhaust particulate filters including a porous substrate having thereon a concentration of inert nanoparticles ranging from 0.01 g/L to 60 g/L relative to a filter volume of the substrate, wherein a portion of the inert nanoparticles configured to remain attached during regeneration of the substrate is effective to capture particulates from an exhaust gas stream.

In various embodiments are disclosed methods of preparing engine exhaust particulate filters including flowing nanoparticles in a carrier gas at a space velocity ranging from 1 $hr^{-1}$ to 2,000,000 $hr^{-1}$ through a porous substrate to deposit a concentration of nanoparticles ranging from 0.01 g/L to 60 g/L relative to a filter volume of the substrate and generate regeneration resistant porous structures having a porosity of 70% or more.

In various embodiments are disclosed internal combustion engine systems or vehicles including an internal combustion engine and an engine exhaust particulate filter of any embodiment configured to receive an exhaust gas stream from the internal combustion engine. The exhaust gas stream of various embodiments includes particulates.

In various embodiments are disclosed methods for filtering particulates from an exhaust gas stream including directing an exhaust gas stream from an internal combustion engine through an engine exhaust particulate filter of any embodiment, where the engine exhaust particulate filter removes particulates from the exhaust gas stream.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIGS. 15A and 15B show a vehicle or engine system of various embodiments including a particulate filter connected to an internal combustion engine.

DETAILED DESCRIPTION

Figure 1:
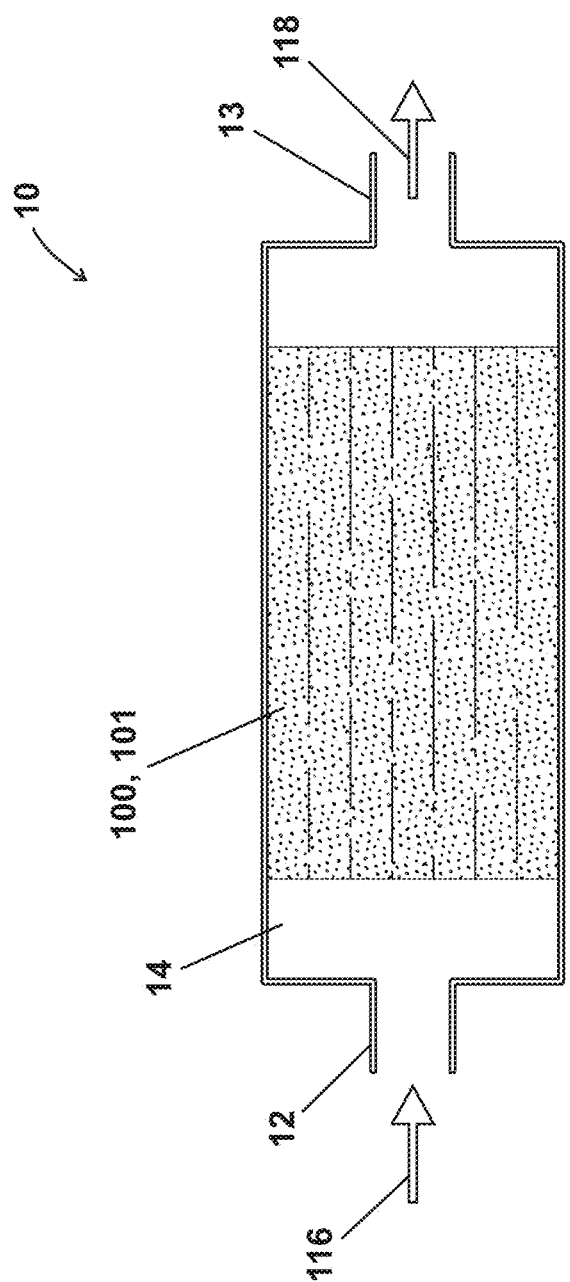
FIG. 1 shows a particulate filter system of various embodiments.

As required, detailed embodiments of the present disclosure are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art.

Except in the examples, or where otherwise expressly indicated, all numerical quantities in this description indicating amounts of material or conditions of reaction and/or use are to be understood as modified by the word "about". The first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

Unless indicated otherwise, all technical and scientific terms used herein have the same meaning as commonly understood by one of ordinary skill in the art to which the present disclosure belongs.

It is also to be understood that this disclosure is not limited to the specific embodiments and methods described below, as specific components and/or conditions may, of course, vary. Furthermore, the terminology used herein is used only for describing particular embodiments and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "or" can be understood to mean "at least one of". The term "and" can also be understood to mean "at least one of" or "all".

The terms "nanoparticle" and "particle" can be used interchangeably to identify particles having a particle size or diameter of less than 1 micron (μm).

The terms "catalytic function", "catalyst", or "catalyst nanoparticles" are understood to mean catalyzing reactions such as oxidation or decomposition of particulates, such as soot, or other exhausted matter, such as oxides of nitrogen.

The terms "inert" or "inert nanoparticles" are understood to mean not capable of a catalytic function.

The terms "engine exhaust particulate filter", "particulate filter", "green particulate filter, "gas particulate filter", or "filter substrate" can be used interchangeably to identify zero or low mileage particulate filters, new particulate filters, or new filter substrates that have not previously been used to filter exhaust from a combustion engine such as a GDI engine.

The terms "porous substrate" or "porous filter substrate" can be used interchangeably to identify substrates and filters used as components for engine exhaust particulate filters.

The terms "internal combustion engine exhaust" and "exhaust gas stream" can be used interchangeably to identify exhaust or gas/gaseous streams from internal combustion engines, where the exhaust or gas/gaseous streams can include particulates. The particulates can, for example, include soot generated from combustion.

The terms "deposit" or "deposited" can also be understood to be attached or disposed within.

The term "portion(s) of" can also be understood to include "some of", "part of", "all of", or "the entirety of".

The disclosure generally relates to filters, methods, and systems for filtering particulates from the exhaust of internal combustion engines such as GDI engines and methods of preparing particulate filters.

In various embodiments are disclosed particulate filters including: a porous filter substrate; and nanoparticles deposited to the substrate and arranged to form a porous structure; wherein the structure is configured to filter particulates from internal combustion engine exhaust. The structure of various embodiments is attached to an external surface of the substrate or is disposed within a pore of the substrate.

In various embodiments are disclosed engine exhaust particulate filters including a porous substrate having thereon inert nanoparticles at a concentration ranging from 0.01 g/L to 60 g/L relative to a filter volume of the substrate, a portion of the nanoparticles arranged to form regeneration resistant porous structures configured to capture particulates from an exhaust gas stream.

In various embodiments are disclosed particulate filters including: a porous filter substrate; and a nanoparticle concentration deposited to the porous filter substrate; wherein the nanoparticle concentration is effective for filtering particulates from internal combustion engine exhaust.

In various embodiments are disclosed engine exhaust particulate filters including a porous substrate having thereon a concentration of inert nanoparticles ranging from 0.01 g/L to 60 g/L relative to a filter volume of the substrate, wherein a portion of the inert nanoparticles configured to remain attached during regeneration of the substrate is effective to capture particulates from an exhaust gas stream.

FIG. 1 shows an example of a particulate filter system 10 of various embodiments including an intake manifold 11 having a cavity 14 coupled to an inlet 12 and outlet 13. The cavity 14 has dimensions sufficient for a particulate filter 100 of various embodiments to be placed within. In operation, the inlet 12 directs internal combustion engine exhaust 116 to the particulate filter 100, where the particulate filter 100 removes particulates from the exhaust 116. The filtered exhaust 118 exits the manifold 11 through the outlet 13.

Figure 2:
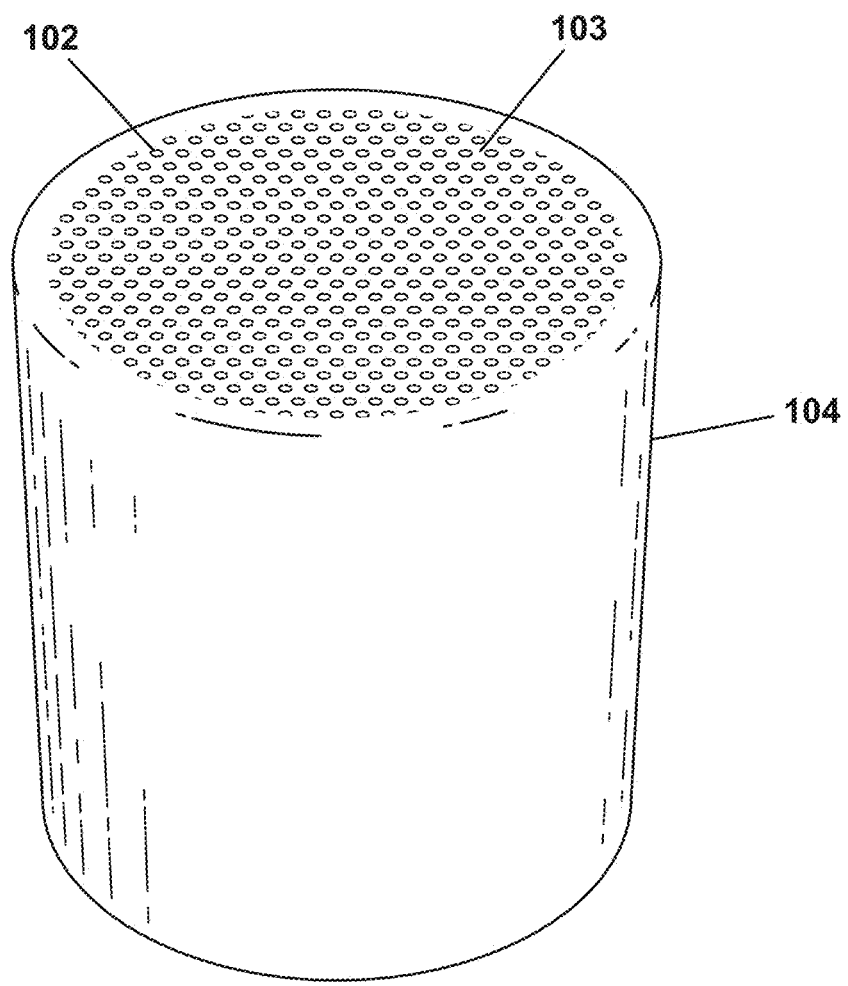
FIG. 2 shows a cylindrical wall-flow monolith.

The particulate filter of various embodiments is a porous filter substrate 101 capable of filtering particulates from internal combustions exhaust (e.g. soot). The porous filter substrate 101 has porous walls 103, where the pores of the porous walls 103 can have with greater than 1 µm pore sizes. For example, the pore sizes can range from 10 µm to 20 µm. The porous filter substrate 101 can also have a porosity of, for example, 45% or more. An example of a porous filter substrate as shown in FIG. 2 is a cylindrical wall-flow monolith 104 having channels 102 and porous walls 103. The porous filter substrate of various embodiments can also be constructed of various materials including, for example, cordierite ($2MgO-2\ Al_2O_3-5SiO_2$), silicon carbide (SiC), or aluminum titanate ($Al_2TiO_5$).

FIGS. 3A, 3B, 3C, and 3D show sectional views of a particulate filter 100 of various embodiments including a porous filter substrate 101 with nanoparticles 200. As shown in FIGS. 3A-3D, the porous filter substrate 101 has an inlet 111 and outlet 112 channels separated by filter walls 113. As shown in FIGS. 3A-3D, the inlet 111 and outlet 112 channels have plugs 114,115 on opposing ends of the filter substrate 101.

Figure 3A:
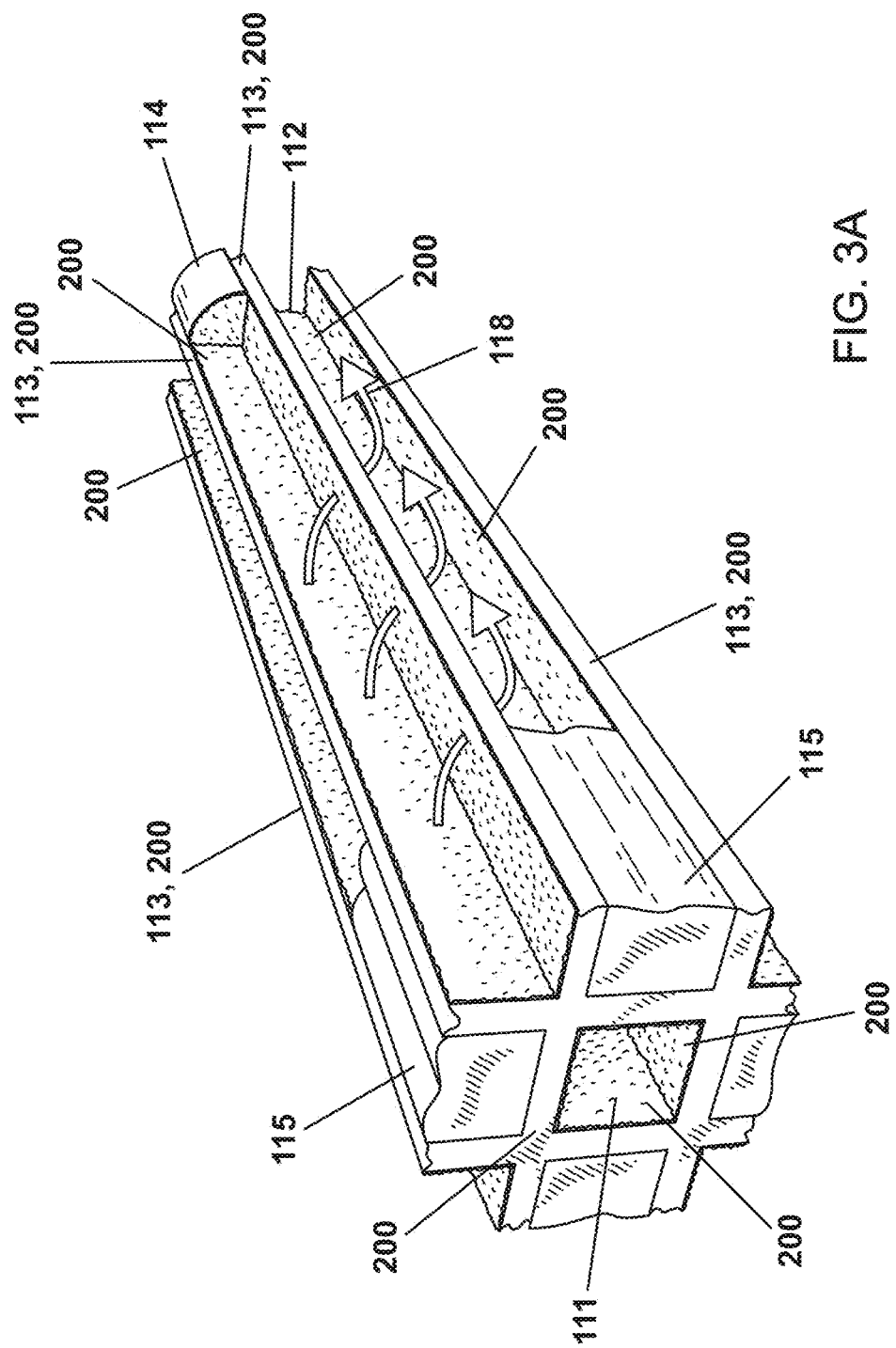
FIGS. 3A, 3B, 3C, and 3D show views of a particulate filter with nanoparticles of various embodiments.
Figure 3B:
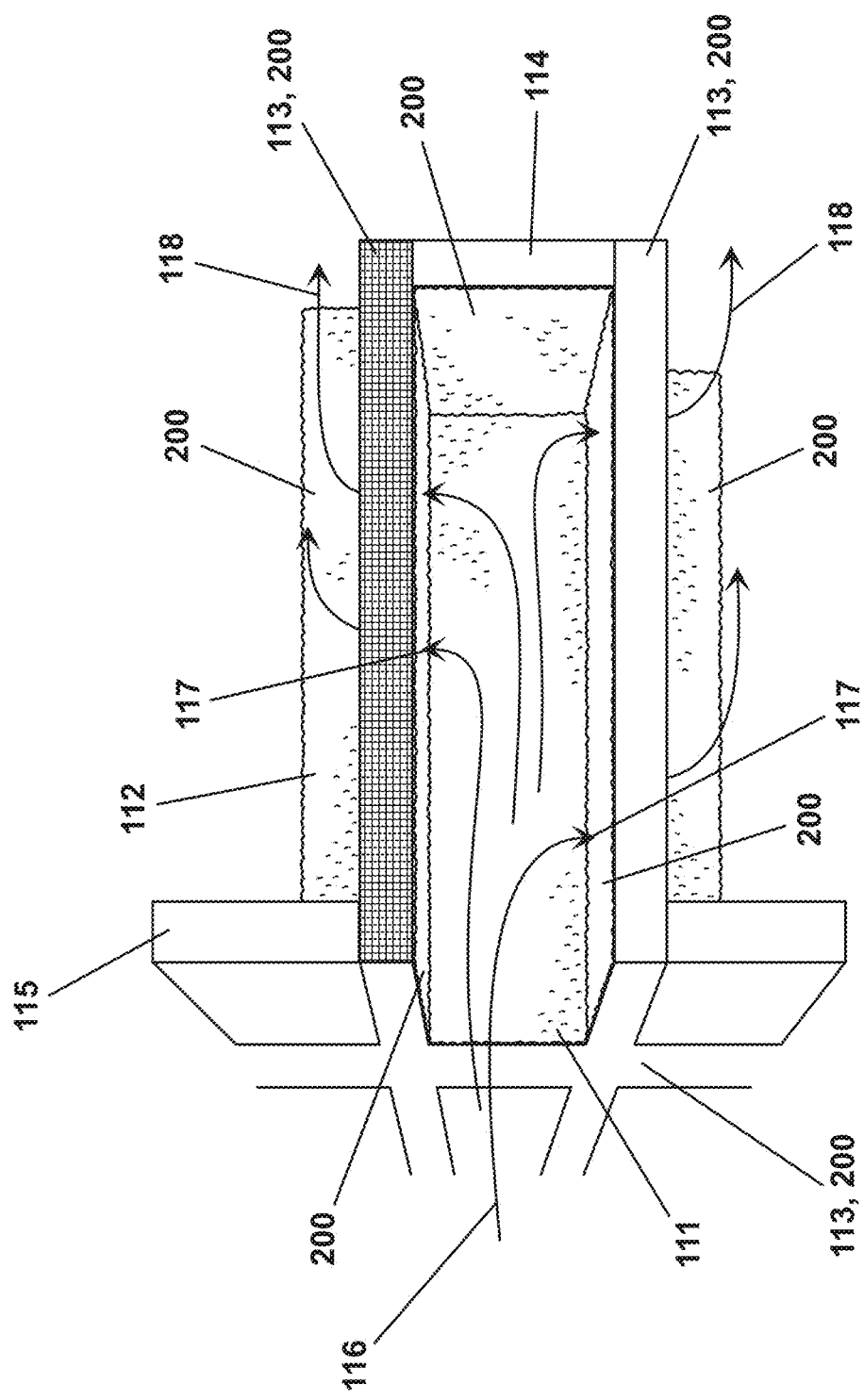
Figure 3C:
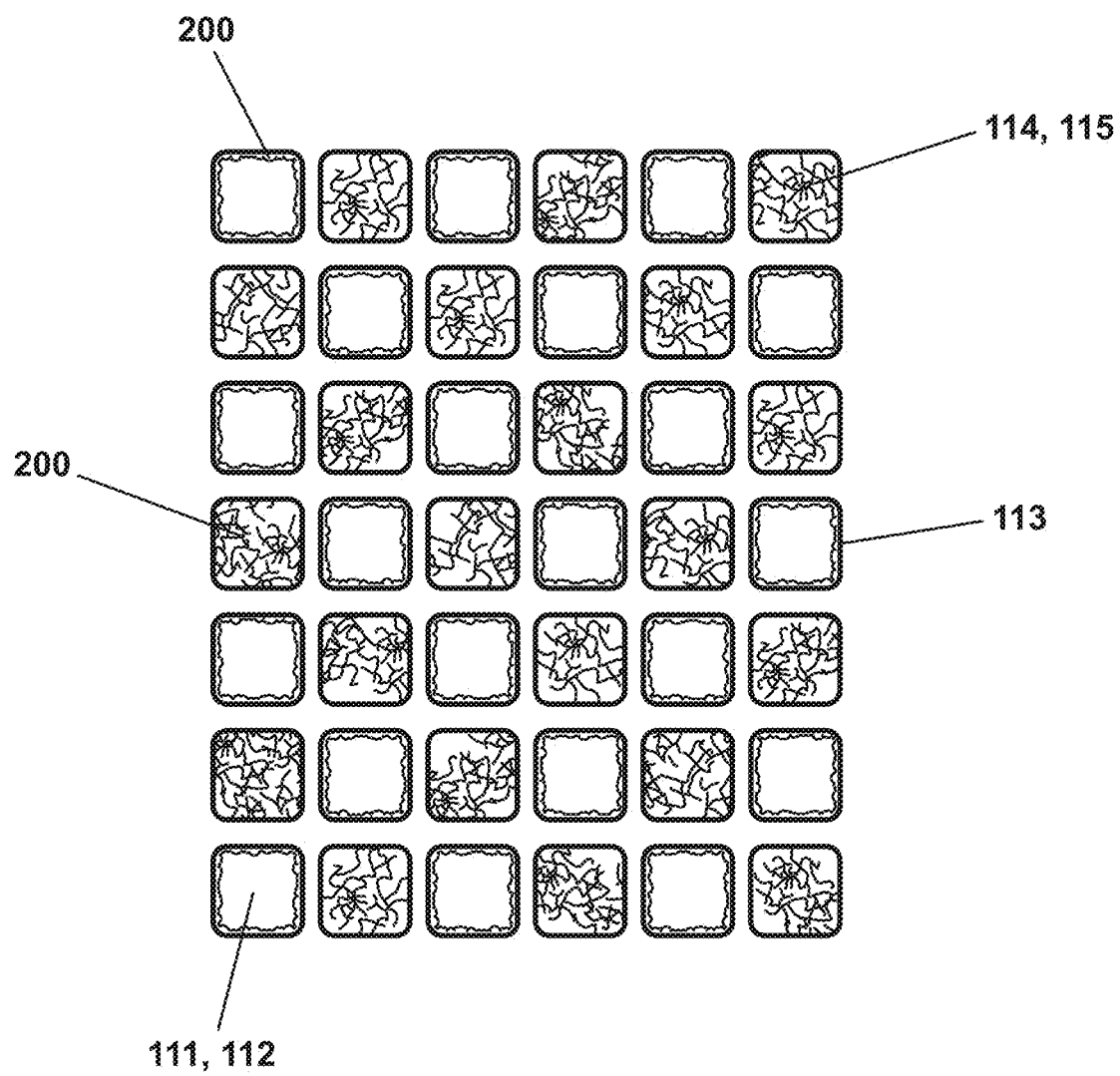
Figure 3D:
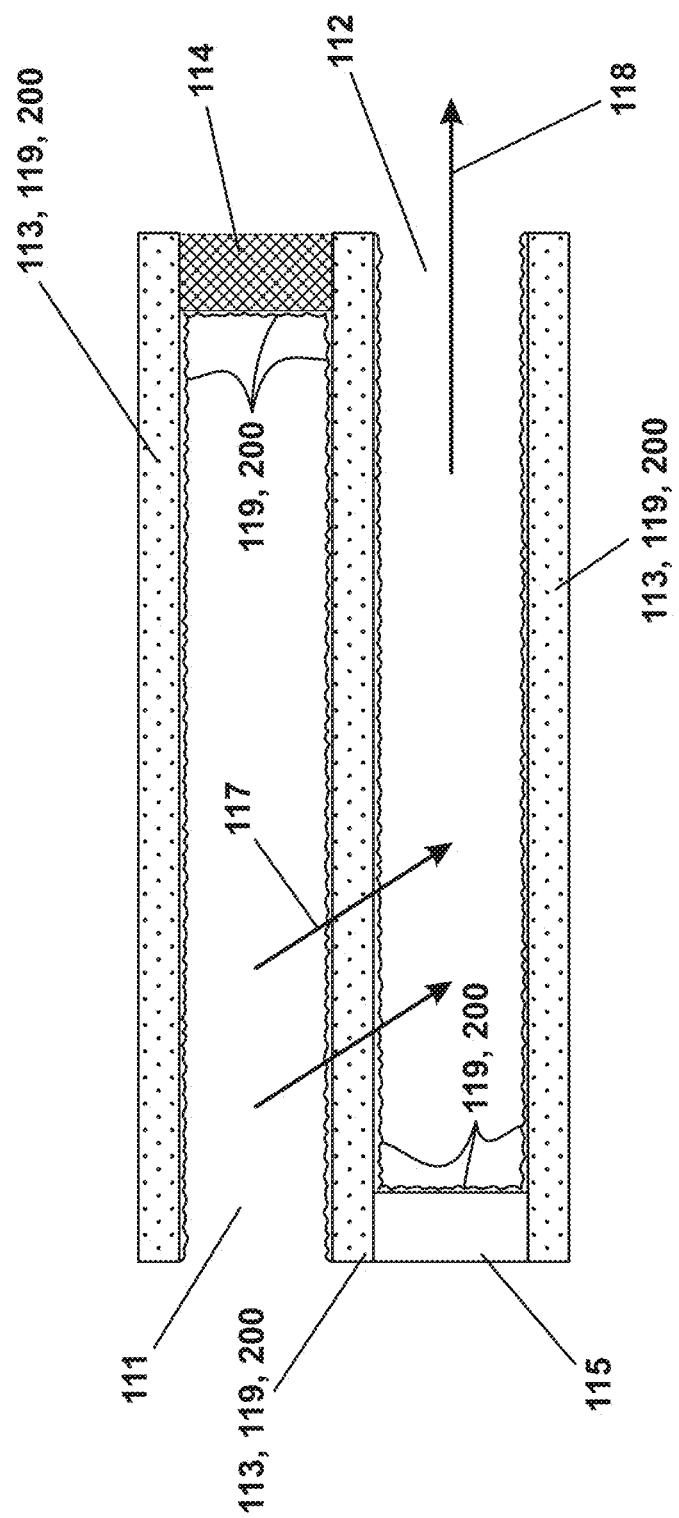

As shown in FIGS. 3A and 3B, particulate laden exhaust 116 from an engine flows into an inlet channel 111 of a porous filter substrate 101, where the plugged end 114 of the inlet channel 111 prevents particulate laden exhaust 116 from exiting the inlet channel 111. The particulate laden exhaust 116 flows through 117 a filter wall 113 and into an outlet channel 112, where the particulates are removed from the exhaust 118. The filter wall 113 is porous (i.e. a porous wall) or includes a porous material. As shown in FIGS. 3A-3D, nanoparticles 200 are deposited to a filter wall 113 that can include on external surfaces of or within a filter wall 113. Nanoparticles 200 within a filter wall 113 can include deposition on material or within a pore. Optionally, nanoparticles 200 can also be deposited on external surfaces of plugs 114,115. External surfaces can include surfaces of a filter wall 113 or plugs 114,115 adjacent to inlets 111 or outlets 112 that are exposed to exhaust 116,118. As shown in FIG. 3D, the filter wall 113 can further include a catalyst 119 capable of catalyzing redox reactions with reactants in the exhaust 116.

Figure 4:
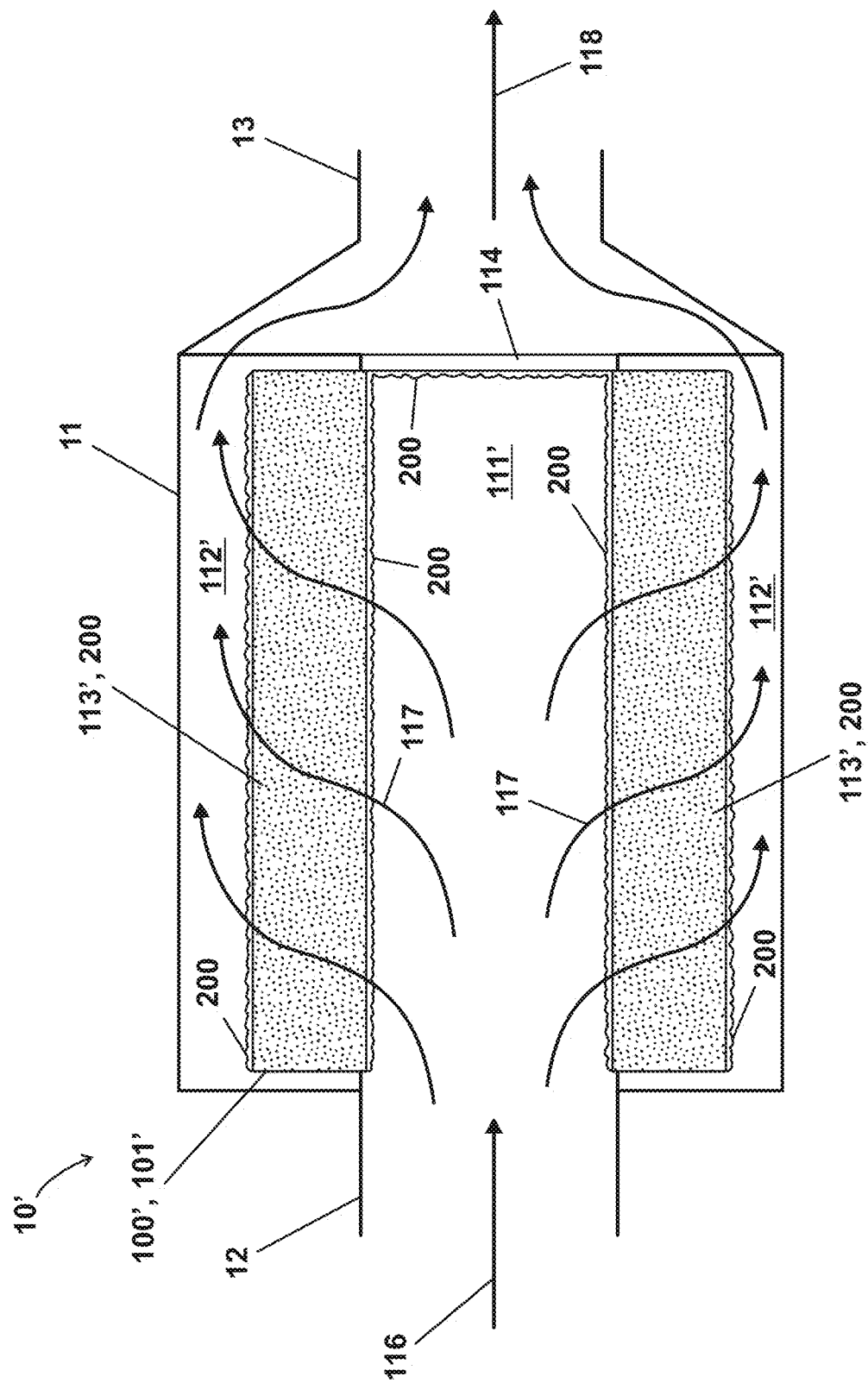
FIG. 4 shows a cross-sectional view of a single channel particulate filter with nanoparticles of various embodiments.

FIG. 4 shows a cross-sectional view of another example of a particulate filter system 10' with a single channel porous filter substrate 100,101' with nanoparticles 200. The single channel particulate filter 101' includes an inlet channel 111' with a plug 114' and outlet(s) or outlet channel(s) 112'. The inlet channel 111' and outlet(s) 112' are separated by filter wall(s) 113'. As shown in FIG. 4, particulate laden exhaust 116 from an engine flows through an inlet 12 into an inlet channel 111', where the plugged end 114' of the inlet channel 111' prevents particulate laden exhaust 116 from exiting the inlet channel 111'. The particulate laden exhaust 116 flows through 117 a filter wall 113' and into an outlet 112', where the particulates are removed from the exhaust 118. The exhaust 118 flows from the intake manifold 11 through the outlet 13. Nanoparticles 200 are deposited to a filter wall 113' that can include on external surfaces of or within a filter wall 113'. Nanoparticles 200 within a filter wall 113' can include deposition on or within a pore. Optionally, nanoparticles 200 can also be deposited on an external surface of a plug 114'. External surfaces can include surfaces of a filter wall 113' or plug 114' adjacent to the inlet 111' or outlet 112' that are exposed to exhaust 116,118.

Nanoparticles of various embodiments are deposited to the porous filter substrate. In various embodiments, the nanoparticles are a plurality of different nanoparticles. The differences in the nanoparticles can include, for example, different sizes, shapes, or including different compounds.

In various embodiments, the nanoparticles have a median particle size ranging from 1 nm to 500 nm. Alternatively, the nanoparticles of various embodiments have a particle size ranging from 1 nm to less than 1 µm.

Figure 5:
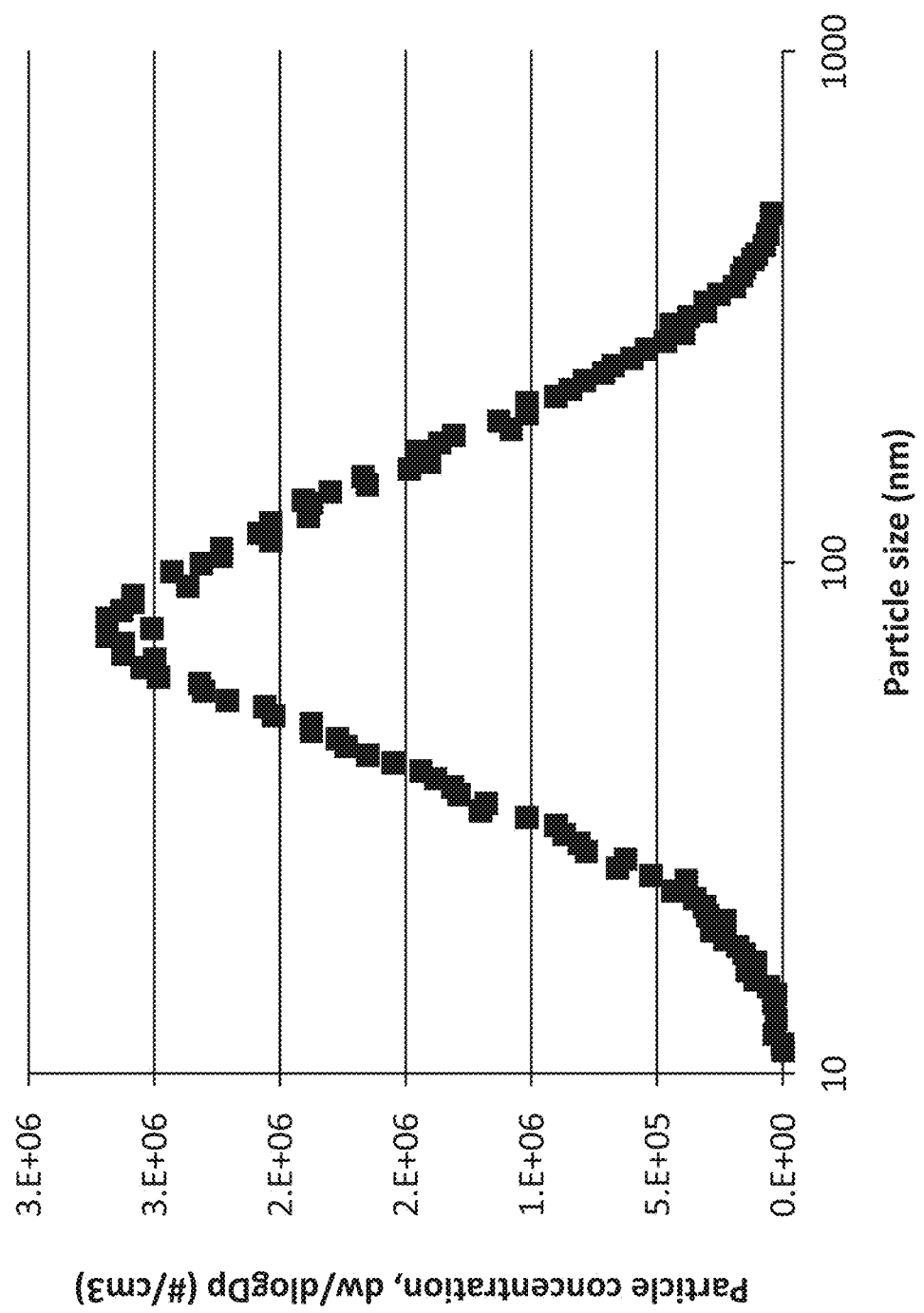
FIG. 5 shows a size distribution of nanoparticles of various embodiments.
Figure 6:
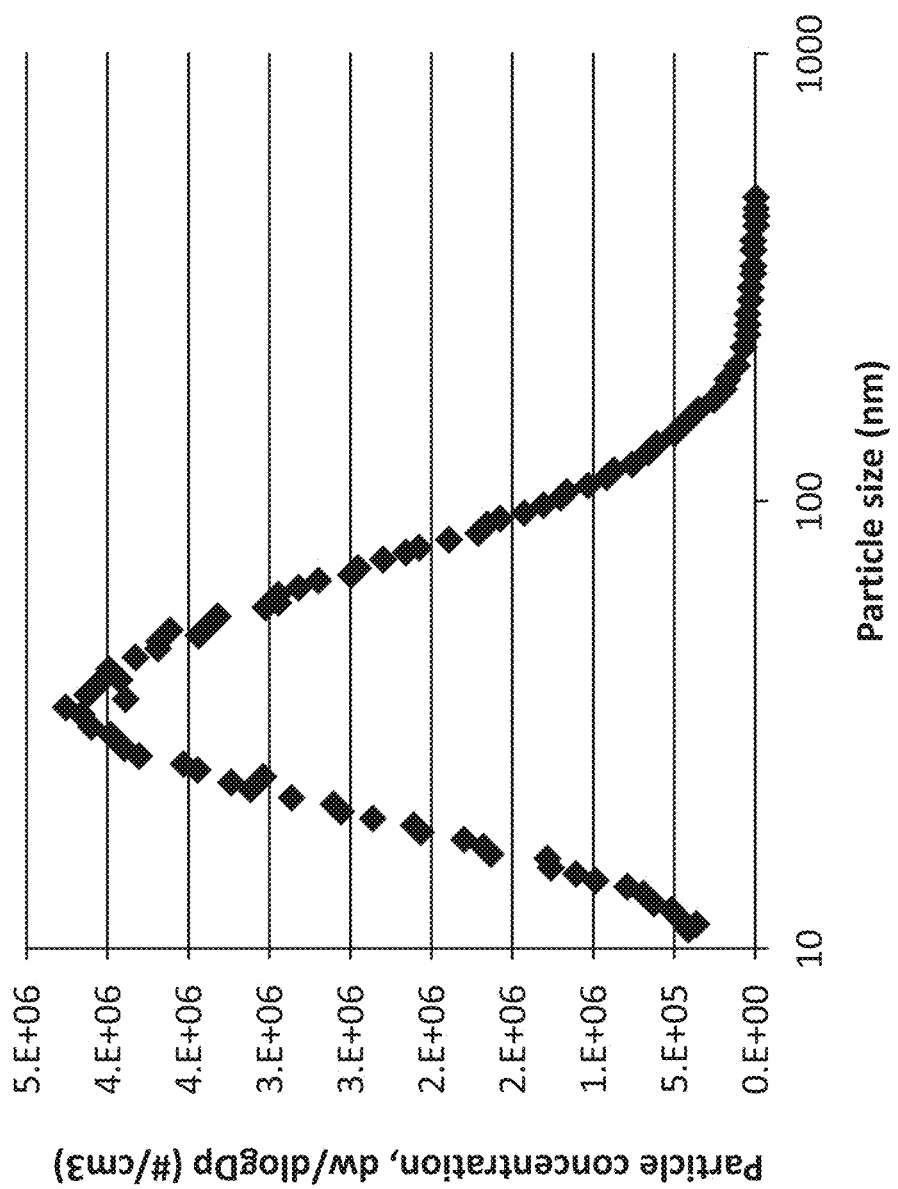
FIG. 6 shows a size distribution of nanoparticles prepared by a precursor compound of various embodiments.
Figure 7:
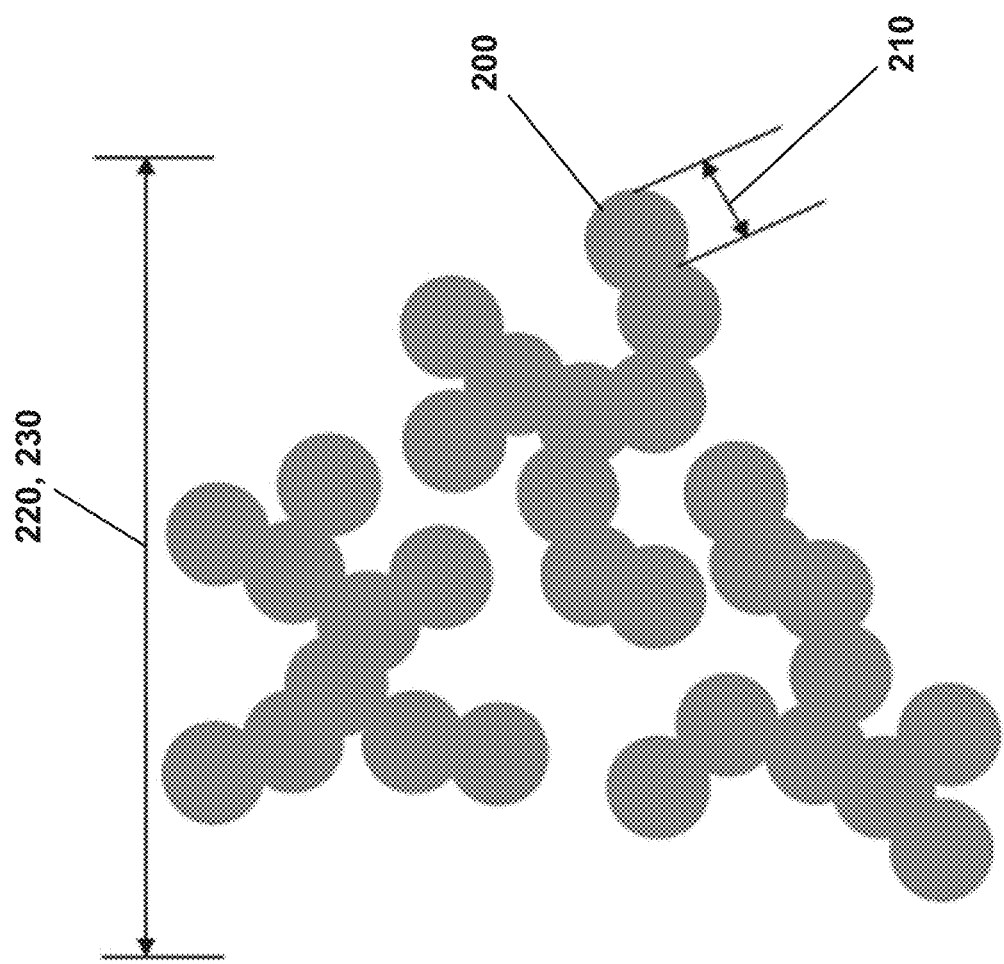
FIG. 7 shows a view of agglomerated nanoparticles of various embodiments.

As previously indicated, the nanoparticles of various embodiments have a particle size, an average/mean particle size, or a median particle size of less than 1 µm. In various embodiments, the nanoparticles have a particle size, an average/mean particle size, or a median particle size of 0.5 nm, 1 nm, 3 nm, 5 nm, 10 nm, 30 nm, 40 nm, 70 nm, 80 nm, 90 nm, 100 nm, 130 nm, 180 nm, 230 nm, 250 nm, 280 nm, 500 nm, 750 nm, 900 nm, 950 nm, 975 nm, or less than 1000 nm. In various embodiments, the particle size, average/mean particle size, or median particle size of the nanoparticles is a range between any two particle sizes listed above. Examples of particle size distributions are shown in FIGS. 5 and 6. FIG. 7 also shows a particle size 210 of a nanoparticle 200.

In various embodiments, the nanoparticles are formed from agglomerated nanoparticles. The agglomerated nanoparticles of various embodiments have a particle size, an average/mean particle size, or a median particle size of 200 µm or less. The agglomerated nanoparticles of various embodiments have a particle size, an average/mean particle size, or a median particle size of 0.05 µm, 0.1 µm, 0.5 µm, 1 µm, 2 µm, 3 µm, 4 µm, 5 µm, 6 µm, 7 µm, 8 µm, 9 µm, 10 µm, 20 µm, 30 µm, 40 µm, 50 µm, 60 µm, 70 µm, 80 µm, 90 µm, 100 µm, 110 µm, 120 µm, 130 µm, 140 µm, 150 µm, 160 µm, 170 µm, 180 µm, 190 µm, or 200 µm. In various embodiments, the particle size, average/mean particle size, or median particle size of the agglomerated nanoparticles is a range between any two particle sizes listed above. FIG. 7 shows a particle size 230 of agglomerated nanoparticles 220.

In various embodiments, the agglomerated nanoparticles have a porosity of 50% or more. In various embodiments, the porosity of the agglomerated nanoparticles is 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100%. In various embodiments, the porosity of the agglomerated nanoparticles is a range between any two porosities listed above.

The nanoparticles of various embodiments include various catalyst nanoparticles having catalytic functions or various inert particles that can include various metal nanoparticles. Catalytic function, for example, can include catalyzing reactions such as oxidation or decomposition of particulates, such as soot, or other exhausted matter, such as oxides of nitrogen (e.g. nitrous oxide gas ($N_2O$)). Examples of materials with catalytic function include rhodium, platinum, palladium, ruthenium, or silver. Inert or inert nanoparticles, for example, can be understood to mean not capable of a catalytic function.

In other embodiments, the inert or metal particles can be impregnated with other metal particles and/or particles having catalytic functions. In other embodiments, nanoparticles include metals such as metal oxides, transition metals, post-transition metals, metalloids, lanthanoids, or rare-earth metals. Examples include alumina, silica, titania, zirconia, or ceria.

The nanoparticles of various embodiments can include, for example, metal particles, metal oxide particles, alumina particles (or γ-alumina), silica particles, titania particles, zirconia particles, ceria particles, iron oxide particle, or combinations thereof. The metal particles of various embodiments can also be understood to include, for example, metal oxide particles, alumina particles (or γ-alumina), silica particles, titania particles, zirconia particles, ceria particles, iron oxide particle, or combinations thereof. In various embodiments, the particles are porous or can include a dopant. Examples of dopants can include transition metals such as iron, magnesium, rhodium, or platinum.

In various embodiments, the filter substrate can further include a catalyst such as platinum, palladium, rhodium, cerium, iron, manganese, or nickel deposited to the porous wall.

In various embodiments, the nanoparticle concentration ranges relative to a filter volume of the substrate is 60 grams per liter (g/L) or less. In various embodiments, the nanoparticle concentration ranges relative to a filter volume of the substrate is 0.01 g/L, 0.02 g/L, 0.03 g/L, 0.04 g/L, 0.05 g/L, 0.06 g/L, 0.07 g/L, 0.08 g/L, 0.09 g/L, 0.1 g/L 0.2 g/L, 0.3 g/L, 0.4 g/L, 0.5 g/L, 0.6 g/L, 0.7 g/L, 0.8 g/L, 0.9 g/L, 1 g/L, 2 g/L, 3 g/L, 4 g/L, 5 g/L, 6 g/L, 7 g/L, 8 g/L, 9 g/L, 10 g/L, 15 g/L, 20 g/L, 25 g/L, 30 g/L, 35 g/L, 40 g/L, 45 g/L, 50 g/L, 55 g/L, or 60 g/L. In various embodiments, the nanoparticle concentration ranges relative to a filter volume of the substrate is a range between any two concentrations listed above.

In various embodiments as shown in FIGS. 3A-3D and 4, a nanoparticle concentration or a portion of the nanoparticles is stably attached to the porous filter substrate such that the nanoparticles remain attached when the particulate filter undergoes regeneration to remove trapped particulates. Regeneration can occur at high temperatures (600° C.) for extended periods of time including 10 minutes, 15 minutes, 20 minutes, 25 minutes, 30 minutes, 35 minutes, or 40 minutes. In various embodiments, the time for regeneration of the particulate filter is a range between any two times listed above.

In various embodiments, the portion of the nanoparticle concentration that remains stably attached to the porous filter substrate after regeneration is 50% or more or 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100%. In various embodiments, the portion of the portion that remains stably attached to the porous filter substrate after regeneration is a range between any two percentages listed above. The portion of the nanoparticle concentration of various embodiments can also remain attached through multiple regeneration intervals of the particulate filter. In other embodiments, the portion of the nanoparticle concentration remains attached to the substrate throughout 50%, 60%, 70%, 80%, 90%, or 100% of a lifetime of the particulate filter. In various embodiments, the percentage of the lifetime is a range between any two percentages listed above.

Figure 8:
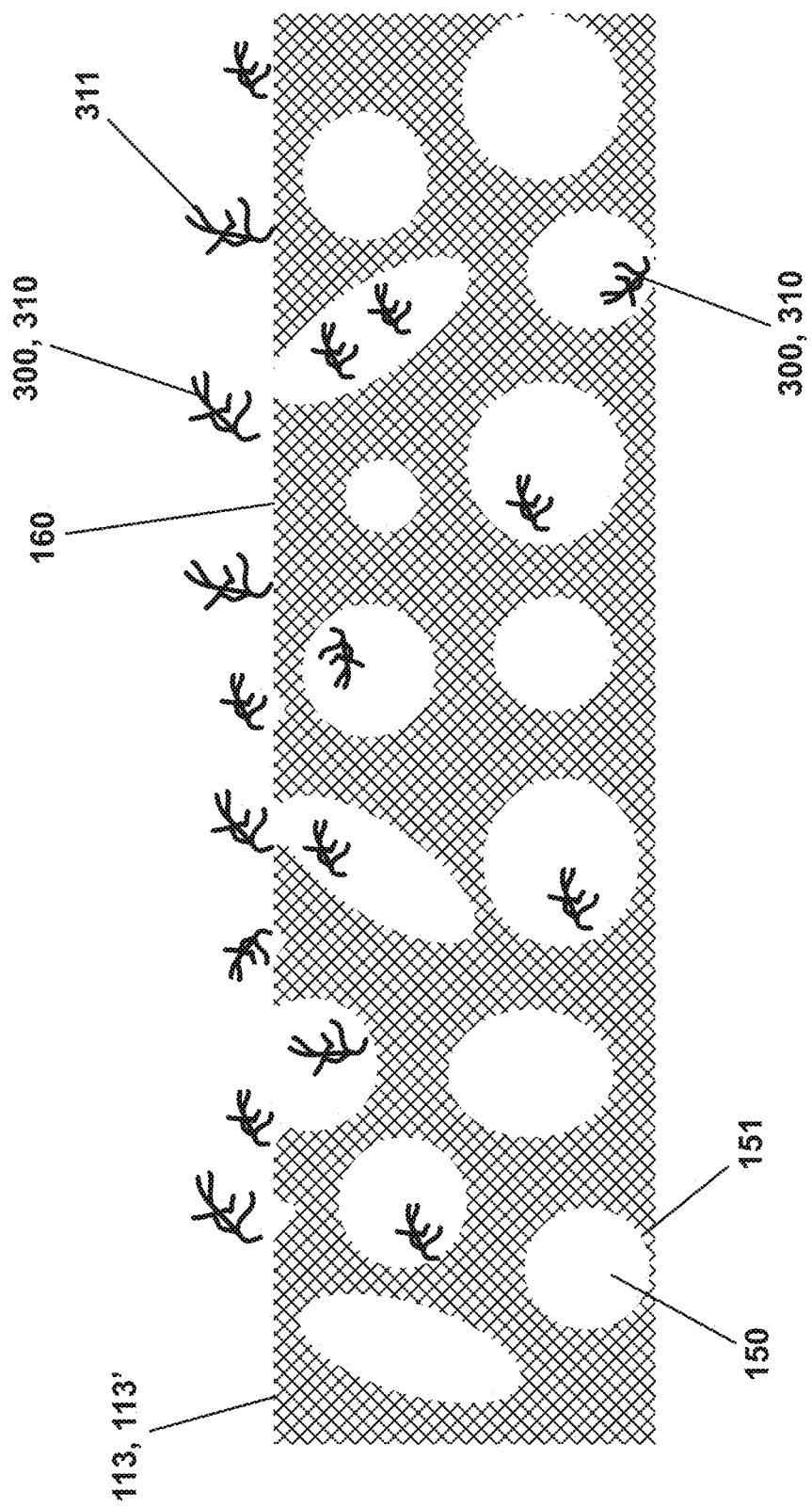
FIGS. 8 and 9 are illustrations showing nanoparticles of various embodiments forming porous structures on external surfaces and within pores of the filter wall of a porous filter substrate.
Figure 9:
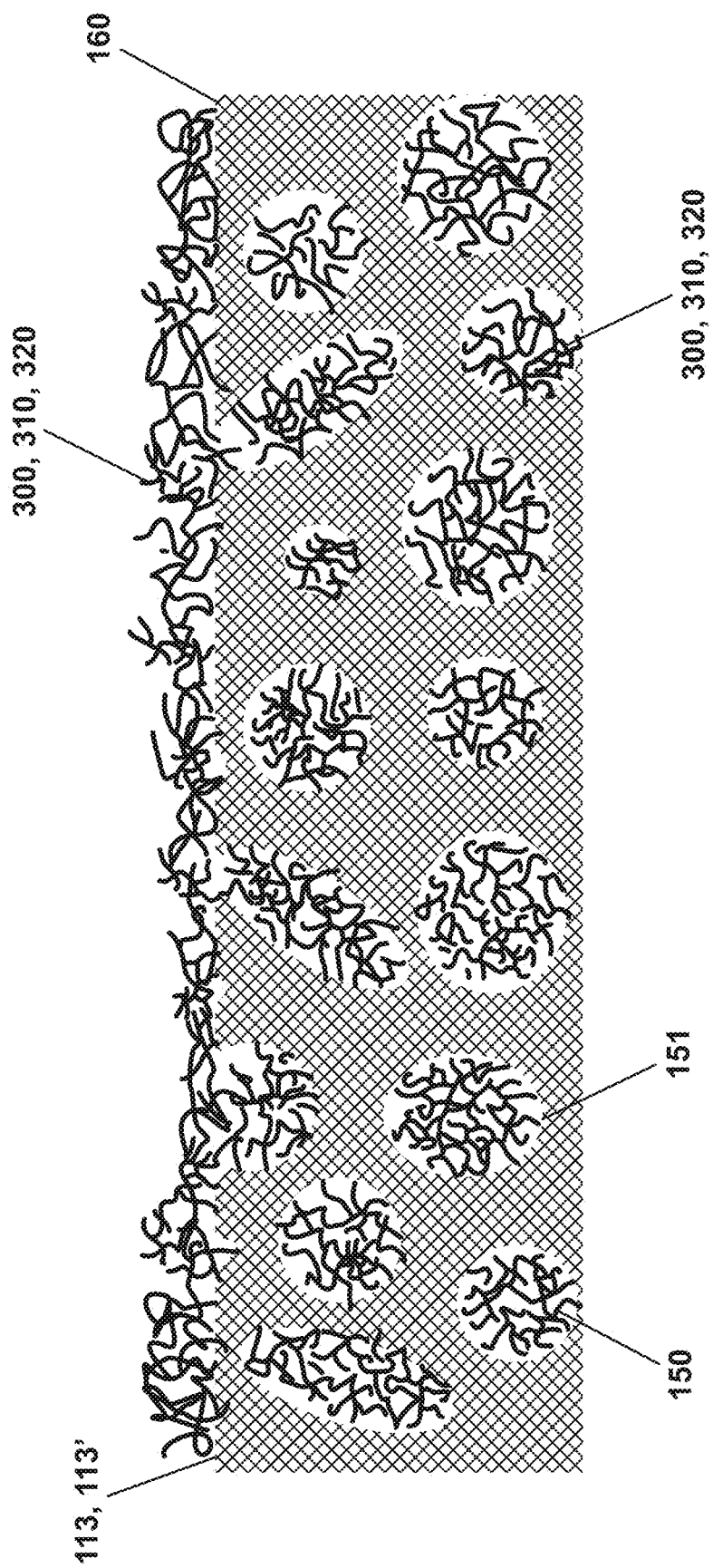

In various embodiments, the nanoparticles form a porous structure. FIGS. 8 and 9 are illustrations showing nanoparticles 200 of various embodiments deposited to a porous filter substrate 101,101' and formed into a porous structure 300. As shown in FIG. 8, the porous structure 300 can have an appearance of a branching or dendritic structure 310 extending from an external surface 160 of a filter wall 113,113'. The branching or dendritic structure 310 can have projections 311 and the sizes of the branching or dendritic structures 310 can be nanoscale (<1 μm) or microscale (<1 mm). In various embodiments, the porous structure 300 is a plurality of branching structures 310 connecting with each other to form an interconnecting structure 320. As shown in FIG. 9, the branching structure 310 are capable of bridging with different branching structures 310 or interconnecting structures 320. FIG. 9 shows interconnecting structures 320 extending from an external surface 160 of a filter wall 113,113'. The size of the interconnecting structure 320 can be microscale (<1 mm) or macroscale (≥1 mm). The interconnecting structures of various embodiments can have an appearance similar to an interconnected fractal or web-like structure or dendritic fractal structure. As disclosed, a porous structure of various embodiments refers to any structure including branching, or dendritic structures or interconnecting structures of any embodiment.

FIGS. 8 and 9 also show the nanoparticles 200 of various embodiments agglomerating as branching structures 310 or interconnecting structures 320 within pores 150 of a filter wall 113,113'. The nanoparticles 200 of various embodiments are capable of being deposited through the entire depth of a porous filter substrate 101,101'. To this extent, nanoparticles 200 of various embodiments deposited within a pore 150 of a filter wall 113,113' and are capable of attaching to a surface 151 defining a pore 151 and forming agglomerating or branching structures 310 or interconnecting structures 320 within the pore 150.

In various embodiments, porous structure has a porosity of 70% or more. In various embodiments, the porous structure has a 70%, 70.5%, 71%, 71.5%, 72%, 72.5%, 73%, 73.5%, 74%, 74.5%, 75%, 75.5%, 76%, 76.5%, 77%, 77.5%, 78%, 78.5%, 79%, 79.5%, 80%, 80.5%, 81%, 81.5%, 82%, 82.5%, 83%, 83.5%, 84%, 84.5%, 85%, 85.5%, 86%, 86.5%, 87%, 87.5%, 88%, 88.5%, 89%, 89.5%, 90%, 90.5%, 91%, 91.5%, 92%, 92.5%, 93%, 93.5%, 94%, 94.5%, 95%, 95.5%, 96%, 96.5%, 97%, 97.5%, 98%, 98.5%, 99%, 99.5%, or less than 100% porosity. In various embodiments, the porosity of the porous structure is a range between any two percentages listed above.

In various embodiments, at least a portion of the nanoparticle concentration form the porous structure. A portion of the nanoparticles or nanoparticle concentration that form a porous structure is 5, 10, 15, 20, 25, 50, 75, 90, 95, or 100 percent of the nanoparticles. In various embodiments, the portion of the particles that agglomerate as a porous structure is a range between any two of the percentages of the nanoparticles listed above.

In various embodiments, a portion of the branching structures that connect to form interconnecting structures is 5, 10, 15, 20, 25, 50, 75, 90, 95, or 100 percent of the branching structures. In various embodiments, the percentage of branching structures that connect is a range between any two of the percentages listed above.

In various embodiments, the porous structure is a regeneration resistant porous structure, where the regeneration resistant porous structure has a stability such as temperature stability or a mechanical/chemical strength for use as a component of a particulate filter capable of undergoing regeneration to remove trapped particulates. Thus, the regeneration resistant porous structure is maintained during regeneration of the particulate filter. The regeneration resistant porous structure of various embodiments has a stability or mechanical/chemical strength sufficient for withstanding multiple regeneration intervals of the particulate filter. In other embodiments, the regeneration resistant porous structure is capable of being maintained on or within the filter substrate throughout 50%, 60%, 70%, 80%, 90%, or 100% of a lifetime of the particulate filter. In various embodiments, the percentage of the lifetime is a range between any two percentages listed above. Regeneration can occur at high temperatures (~600° C.) for extended periods of time including 10 minutes, 15 minutes, 20 minutes, 25 minutes, 30 minutes, 35 minutes, or 40 minutes. In various embodiments, the time for regeneration of the particulate filter is a range between any two times listed above.

Figure 10A:
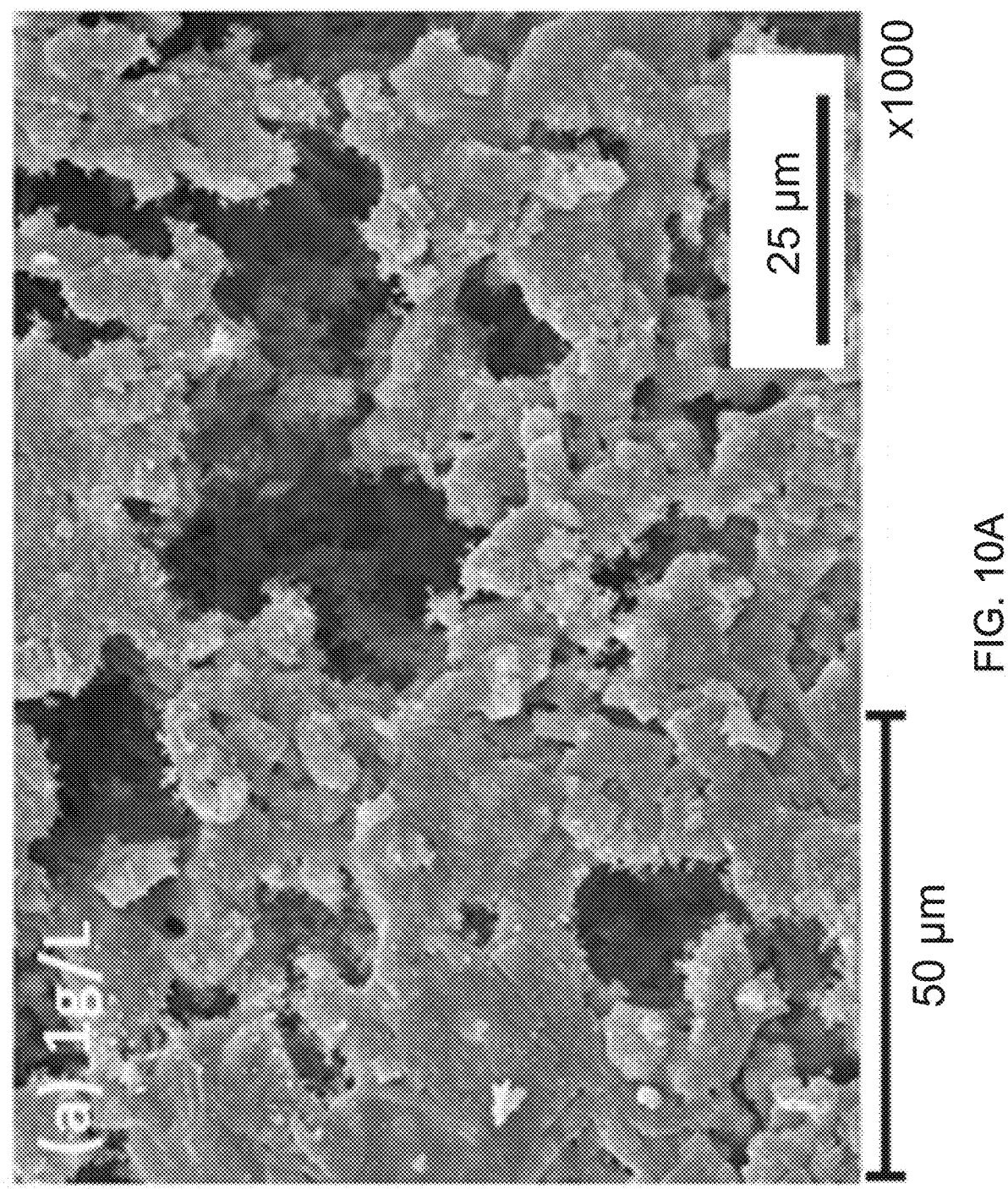
FIG. 10A shows a view of 1 g/L nanoparticles deposited on a filter wall at a 1000× magnification. 25 µm and 50 µm reference lengths are also shown.
Figure 10B:
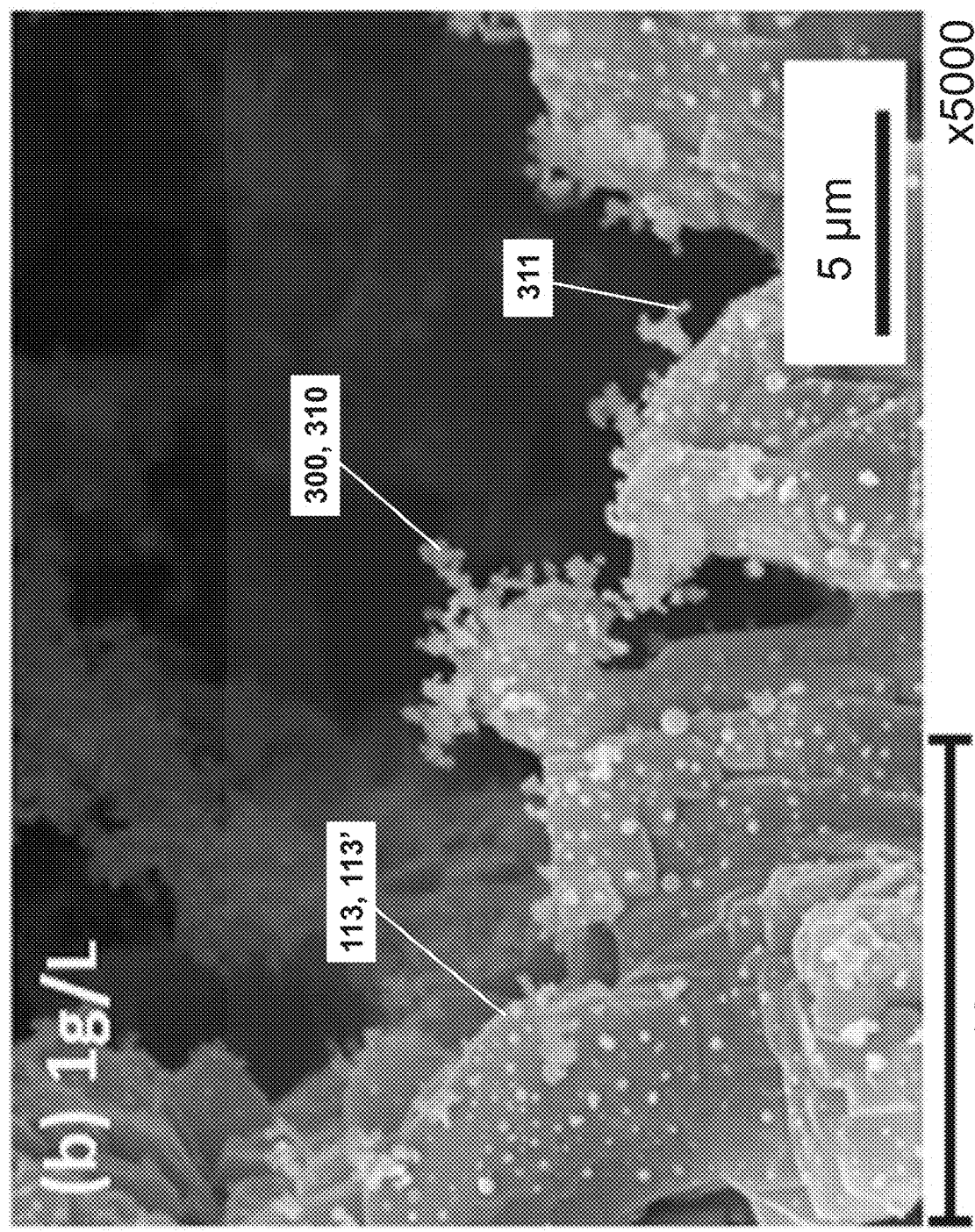
FIG. 10B shows a view of 1 g/L nanoparticles deposited on a filter wall at a 5000× magnification. 5 µm and 10 µm reference lengths are also shown.
Figure 10C:
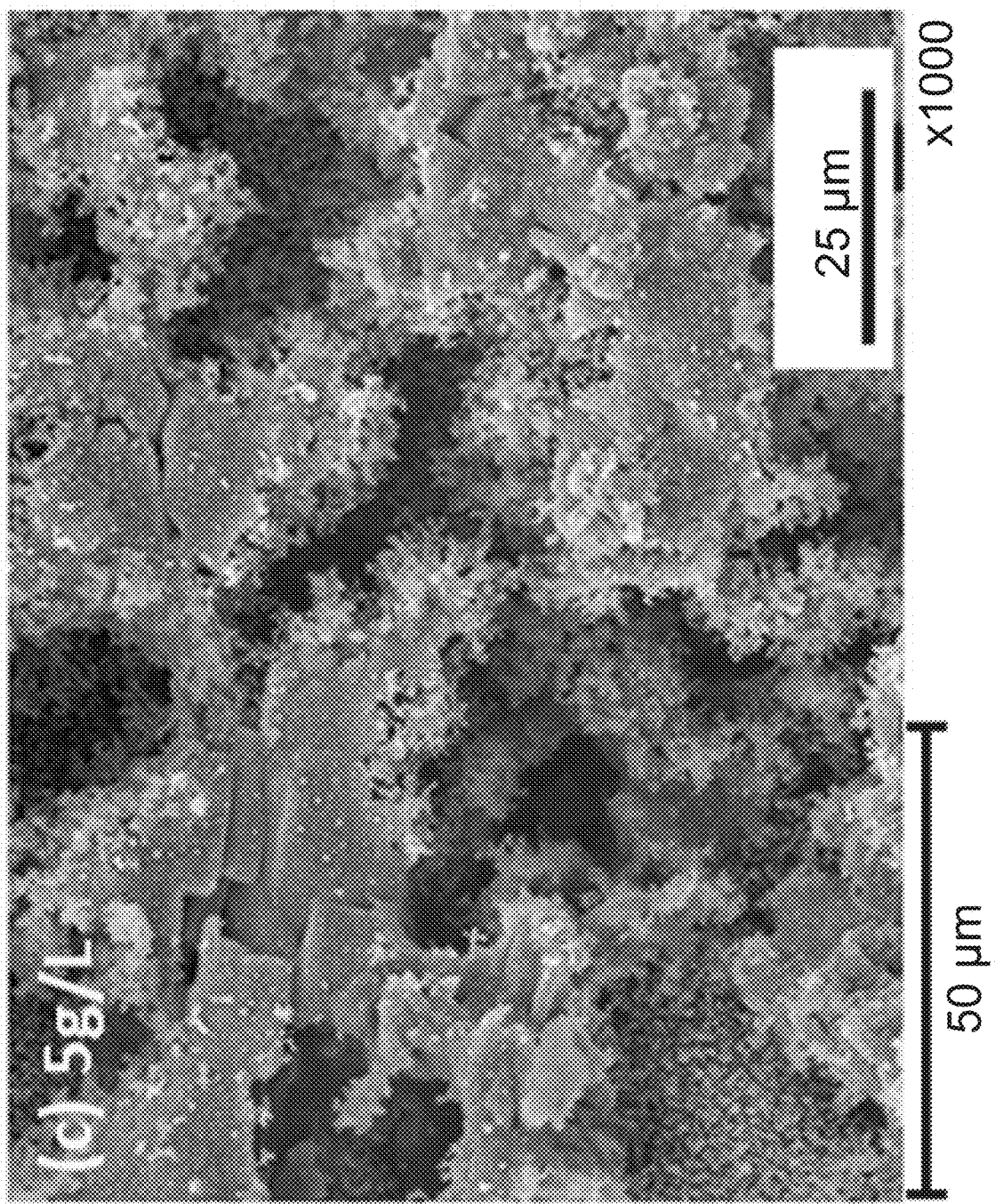
FIG. 10C shows a view of 5 g/L nanoparticles deposited on a filter wall at a 1000× magnification. 25 µm and 50 µm reference lengths are also shown.
Figure 10D:
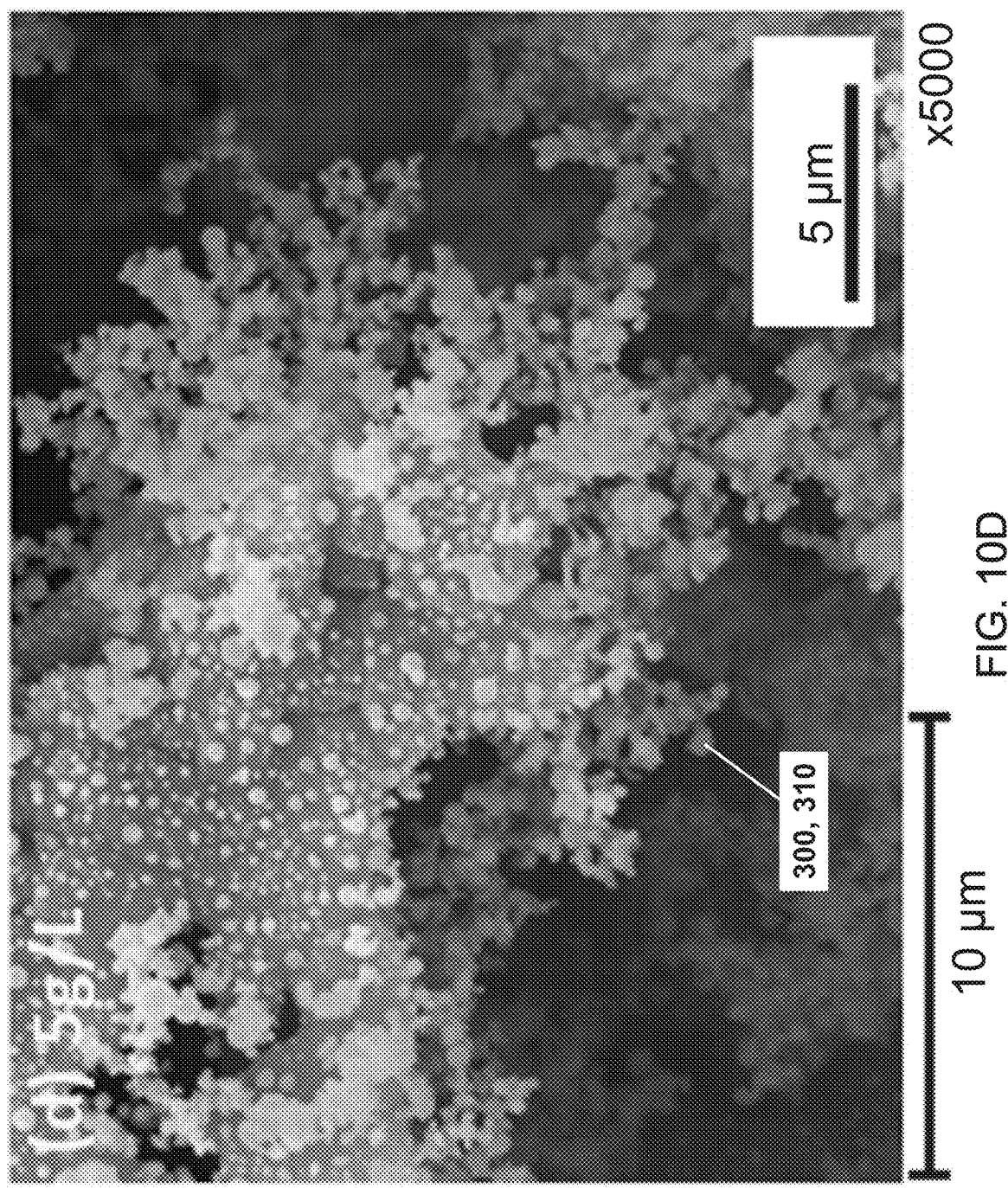
FIG. 10D shows a view of 5 g/L nanoparticles deposited on a filter wall at a 5000× magnification. 5 µm and 10 µm reference lengths are also shown.

FIGS. 10A, 10B, 10C, and 10D show views of nanoparticles 200 deposited on a filter wall 113,113' of a porous filter substrate 101,101' of various embodiments. FIGS. 10A and 10B show the surface morphology of a filter wall 113,113' of a porous filter substrate 101 such as a cordierite filter with a concentration of nanoparticles 200 deposited to an external surface 160 of a filter wall 113,113'. FIGS. 10C and 10D are similar to FIGS. 10A and 10B but have a greater loading of nanoparticles 200 deposited to an external surface 160 of a filter wall 113,113'. As shown in FIGS. 10A-10D, a portion of the nanoparticles 200 agglomerate as branching structures 310 (i.e. dendritic structures or coral structures) on the filter wall 113,113'. For example as shown in FIGS. 10A-10D, the branching structures 310 further extend from the outer surface of the filter wall 113,113' with a plurality of particle projections 311 (i.e. whiskers or fingers). The nanoparticles of various embodiments are capable of being deposited to the filter wall of the porous filter substrate such that the filter walls and/or the porous filter substrate is homogenously coated.

In various embodiments are disclosed methods of preparing particulate filters including: flowing nanoparticles in a carrier gas at a space velocity ranging from 1 $hr^{-1}$ to 2,000,000 $hr^{-1}$ through a porous filter substrate to deposit a nanoparticle concentration to the substrate; wherein the nanoparticle concentration is effective for filtering particulates from internal combustion engine exhaust.

In various embodiments are disclosed methods of preparing engine exhaust particulate filters including flowing nanoparticles in a carrier gas at a space velocity ranging from 1 $hr^{-1}$ to 2,000,000 $hr^{-1}$ through a porous substrate to deposit a concentration of nanoparticles ranging from 0.01 g/L to 60 g/L relative to a filter volume of the substrate and generate regeneration resistant porous structures having a porosity of 70% or more.

The methods/processes of various embodiments are generally directed to gas flow through processes to coat nanoparticles on porous filter substrates to improve green filtration efficiency for particle emission control on internal combustion exhaust. The method/process of various embodiments is capable of allowing more targeted coating with lower loading equivalents as compared to other methods such as washcoating or sol-gel processes. In various embodiments, either side or both sides of a porous wall adjacent to the inlet or outlet channels can be coated with particles by methods/processes of various embodiments.

In various embodiments, the nanoparticle concentration relative to a filter volume of the substrate is 60 g/L or less. In various embodiments, the nanoparticle concentration relative to a filter volume of the substrate is 0.01 g/L, 0.02 g/L, 0.03 g/L, 0.04 g/L, 0.05 g/L, 0.06 g/L, 0.07 g/L, 0.08 g/L, 0.09 g/L, 0.1 g/L 0.2 g/L, 0.3 g/L, 0.4 g/L, 0.5 g/L, 0.6 g/L, 0.7 g/L, 0.8 g/L, 0.9 g/L, 1 g/L, 2 g/L, 3 g/L, 4 g/L, 5 g/L, 6 g/L, 7 g/L, 8 g/L, 9 g/L, 10 g/L, 15 g/L, 20 g/L, 25 g/L, 30 g/L, 35 g/L, 40 g/L, 45 g/L, 50 g/L, 55 g/L, or 60 g/L. In various embodiments, the nanoparticle concentration ranges relative to a filter volume of the substrate is a range between any two concentrations listed above.

In various embodiments, the flowing step is conducted at a space velocity ranging from 1 $hr^{-1}$ to 2,000,000 $hr^{-1}$, 10 $hr^{-1}$ to 2,000,000 $hr^{-1}$, 100 $hr^{-1}$ to 2,000,000 $hr^{-1}$, or 1 $hr^{-1}$ to 50,000 $hr^{-1}$. In various embodiments, the space velocity of the flowing step is 1 $hr^{-1}$, 10 $hr^{-1}$, 50 $hr^{-1}$, 100 $hr^{-1}$, 200 $hr^{-1}$, 300 $hr^{-1}$, 400 $hr^{-1}$, 500 $hr^{-1}$, 600 $hr^{-1}$, 700 $hr^{-1}$, 800 $hr^{-1}$, 900 $hr^{-1}$, 1,000 $hr^{-1}$, 5000 $hr^{-1}$, 10,000 $hr^{-1}$, 20,000 $hr^{-1}$, 30,000 $hr^{-1}$, 40,000 $hr^{-1}$, 50,000 $hr^{-1}$, 100,000 $hr^{-1}$, 200,000 $hr^{-1}$, 300,000 $hr^{-1}$, 400,000 $hr^{-1}$, 500,000 $hr^{-1}$, 600,000 $hr^{-1}$, 700,000 $hr^{-1}$, 800,000 $hr^{-1}$, 900,000 $hr^{-1}$, 1,000,000 $hr^{-1}$, 1,100,000 $hr^{-1}$, 1,200,000 $hr^{-1}$, 1,300,000 $hr^{-1}$, 1,400,000 $hr^{-1}$, 1,500,000 $hr^{-1}$, 1,600,000 $hr^{-1}$, 1,700,000 $hr^{-1}$, 1,800,000 $hr^{-1}$, 1,900,000 $hr^{-1}$, or 2,000,000 $hr^{-1}$. In various embodiments, the space velocity of the flowing step is a range between any two space velocities listed above.

In various embodiments, methods of preparing particulate filters further include steps of, prior to the flowing, atomizing a nanoparticle suspension and drying the atomized nanoparticles. The methods of various embodiments can further include preparing the nanoparticle suspension. In various embodiments, a precursor compound of the particles in suspension is atomized and dried to form the particles.

In various embodiments, the weight percent of the particles in the suspension is 0.001%, 0.01%, 0.1%, 0.2%, 0.3%, 0.4%, 0.5%, 0.6%, 0.7%, 0.8%, 0.9%, 1%, 2%, 3%, 4%, 5%, or 6%. In various embodiments, the weight percent of the particles is a range between any two weight percentages listed above.

In various embodiments, the flowing step is conducted at a space velocity ranging from 1 $hr^{-1}$ to 50,000 $hr^{-1}$ or 1,000 $hr^{-1}$ to 50,000 $hr^{-1}$. In various embodiments, the space velocity of the flowing step is 1 $hr^{-1}$, 10 $hr^{-1}$, 50 $hr^{-1}$, 100 $hr^{-1}$, 200 $hr^{-1}$, 300 $hr^{-1}$, 400 $hr^{-1}$, 500 $hr^{-1}$, 600 $hr^{-1}$, 700 $hr^{-1}$, 800 $hr^{-1}$, 900 $hr^{-1}$, 1,000 $hr^{-1}$, 5000 $hr^{-1}$, 10,000 $hr^{-1}$, 20,000 $hr^{-1}$, 30,000 $hr^{-1}$, 40,000 $hr^{-1}$, or 50,000 $hr^{-1}$. In various embodiments, the space velocity of the flowing step is a range between any two space velocities listed above.

The following examples illustrate the generation of a nanoparticle suspension of various embodiments. A suspension was prepared by dispersing boehmite nanoparticles in water. The suspension was atomized/sprayed with an atomizer and dried through a furnace or a desiccator. The particle sizes of the particles of various embodiments can be adjusted by changing solid concentration of the suspension and the settings of the atomizer. As shown in FIG. 5, the particle sizes of the generated particles were nanoscale with a peak (median) at about 70-80 nm for 1 weight percent of boehmite in the suspension. In other examples, the generated particles showed a size distribution from 5 to 500 nm with a mean size at around 100 nm as measured by scanning mobility particle sizer (SMPS). Alternatively, a precursor of boehmite (aluminum butoxide) was dissolved in water with pH adjusted to about 4 with nitric acid. The mixture was vigorously mixed to form a clear solution. Similar to what was previously described, the solution was atomized and dried. The particle size distribution for a solution with 0.1 weight percent concentration of the particles is shown in FIG. 6, where the peak (median) of the particle size distribution was around 30-40 nm. The filtration efficiency of a particulate filter prepared by these examples as compared to a bare substrate are shown in FIG. 15.

Figure 11:
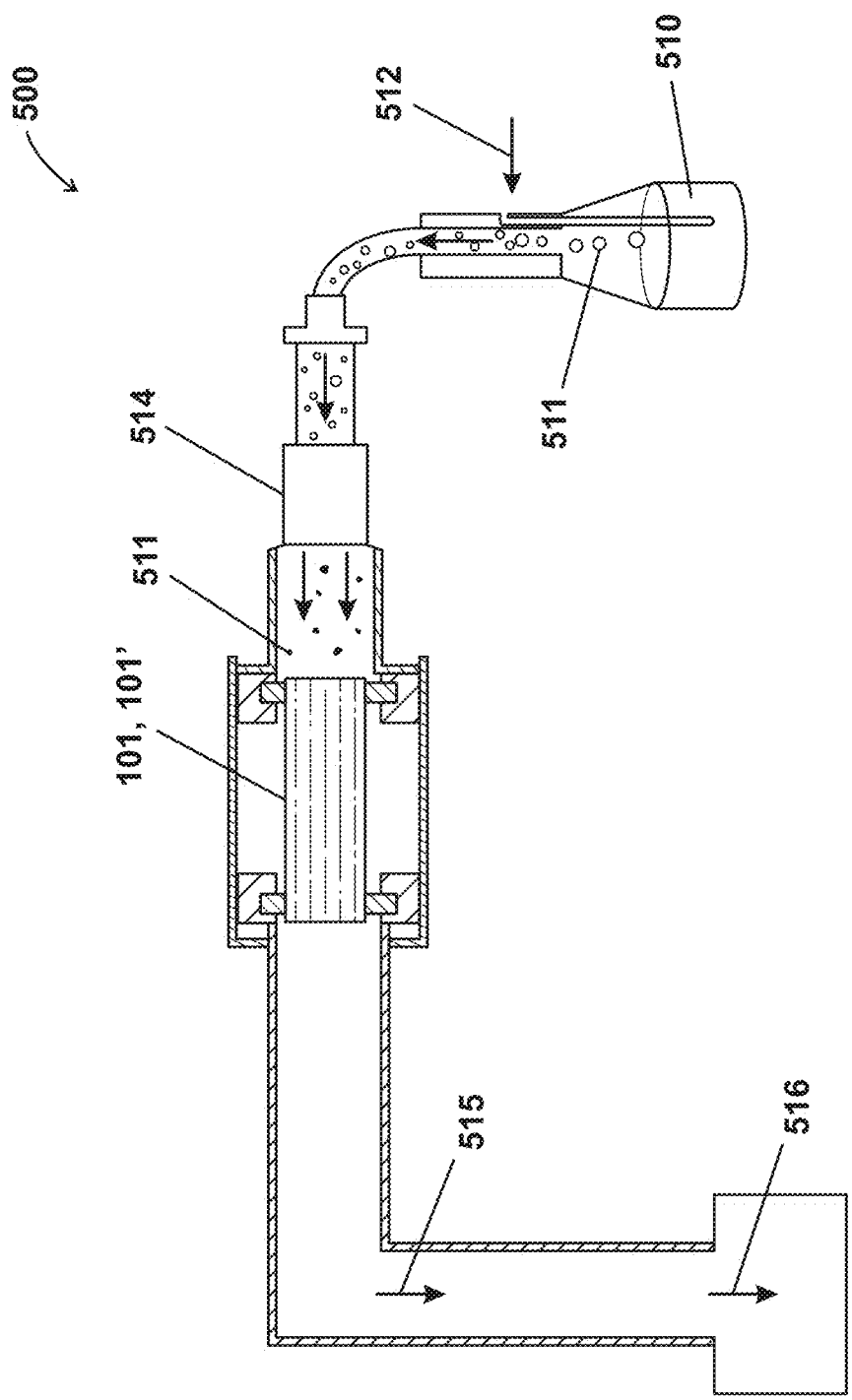
FIG. 11 shows a system of various embodiments for depositing a nanoparticle suspension to a porous filter substrate.
Figure 12:
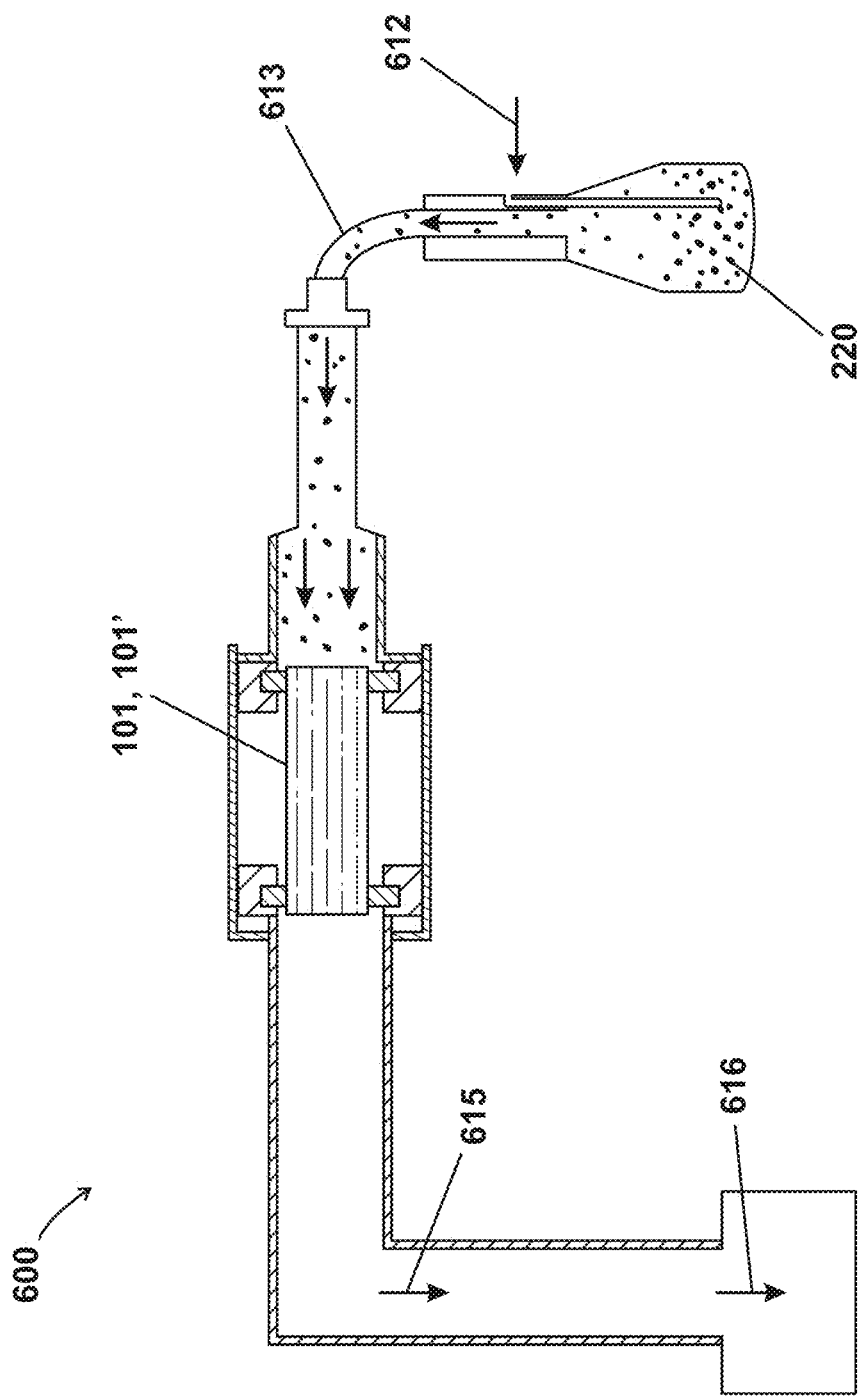
FIG. 12 shows a system of various embodiments for depositing agglomerated nanoparticles to a porous filter substrate.

The following example illustrates methods of preparing a particulate filter of various embodiments from a nanoparticle suspension. FIG. 11 shows a system 500 for preparing a particulate filter 100, 100' from a suspension 510 of nanoparticles 200. As shown in FIG. 11, a nanoparticle suspension 510 is fluidly/gaseously connected to a porous filter substrate 101,101'. The nanoparticle suspension 510 is atomized and combined with a carrier gas 512. Besides atomizing, other techniques can be used to generate the particles and include, for example, spray drying, flame spray pyrolysis, or condensation. The atomized suspension 511 is flowed through tubing/piping 513 towards the porous filter substrate 101,101'. Before reaching the porous filter substrate 101, 101', the atomized suspension 511 can be dried in a dryer/furnace 514. The atomized suspension 511 is flowed through the porous filter substrate 101,101', where a nanoparticle concentration is deposited to the porous filter substrate 101,101'. Nanoparticles that are not deposited on the porous filter substrate 101,101' can be flowed through 515 the porous filter substrate 101,101' and collected 516. In one example, the flow which contained the nanoparticles, either diluted or not, was then passed through a porous filter substrate such as a ceramic filter leaving the nanoparticles within the porous filter substrate. The space velocity of the flow can be adjusted by selecting the filter size, changing the flow rate of the atomizer and changing the flow rate of dilution gas (air, nitrogen or other inert gas). For example, a space velocity ranging from 1,000 to 50,000 $hr^{-1}$ or lower could be used depending on the properties of the aerosol (such as particle concentration, particle density and particle size). The particle loading equivalents of 1 g/L and 5 g/L were tested. The space velocity is capable of being controlled to a low enough point where diffusion is the mechanism for collecting the nanoparticles such that a dendritic structure of the nanoparticles can be formed. FIGS. 10A and 10B show the deposition of 1 g/L of the particles to the filter wall of the porous filter substrate and FIGS. 10C and 10D show the deposition of 5 g/L of the nanoparticles to the filter wall of the porous filter substrate. Dendritic structures shown in FIG. 10A-10D were prepared at a space velocity of 4,000 $hr^{-1}$ for nanoparticles 200 with a median particle size at about 80 nm. FIGS. 10A-10D also show that increasing the loading equivalent of the nanoparticles increased the number and the complexity of the dendritic structures. Furthermore, the loading equivalent was less than a tenth of a typical washcoat loading of approximately 60 g/L (or approximately 1 gram per cubic inch filter).

In various embodiments, the nanoparticles include agglomerated nanoparticles. The nanoparticles, for example, used in the methods or processes of various embodiments can include nanoparticles and agglomerated nanoparticles.

The agglomerated nanoparticles of various embodiments have a particle size, an average/mean particle size, or a median particle size of 200 μm or less. The agglomerated nanoparticles of various embodiments have a particle size, an average/mean particle size, or a median particle size of 0.05 μm, 0.1 μm, 0.5 μm, 1 μm, 2 μm, 3 μm, 4 μm, 5 μm, 6 μm, 7 μm, 8 μm, 9 μm, 10 μm, 20 μm, 30 μm, 40 μm, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, or 200 μm. In various embodiments, the particle size, an average/mean particle size, or a median particle size of the agglomerated nanoparticles is a range between any two particle sizes listed above. FIG. 7 shows a particle size 230 of agglomerated nanoparticles 220.

In various embodiments, the agglomerated nanoparticles have a porosity of 50% or more. In various embodiments, the porosity of the agglomerated nanoparticles is 50% or more or 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100%. In various embodiments, the porosity of the agglomerated nanoparticles is a range between any two porosities listed above.

In various embodiments, the space velocity of the flowing step is 10 $hr^{-1}$, 50 $hr^{-1}$, 100 $hr^{-1}$, 200 $hr^{-1}$, 300 $hr^{-1}$, 400 $hr^{-1}$, 500 $hr^{-1}$, 600 $hr^{-1}$, 700 $hr^{-1}$, 800 $hr^{-1}$, 900 $hr^{-1}$, 1,000 $hr^{-1}$, 5000 $hr^{-1}$, 10,000 $hr^{-1}$, 20,000 $hr^{-1}$, 30,000 $hr^{-1}$, 40,000 $hr^{-1}$, or 50,000 $hr^{-1}$, 100,000 $hr^{-1}$, 200,000 $hr^{-1}$, 300,000 $hr^{-1}$, 400,000 $hr^{-1}$, 500,000 $hr^{-1}$, 600,000 $hr^{-1}$, 700,000 $hr^{-1}$, 800,000 $hr^{-1}$, 900,000 $hr^{-1}$, 1,000,000 $hr^{-1}$, 1,100,000 $hr^{-1}$, 1,200,000 $hr^{-1}$, 1,300,000 $hr^{-1}$, 1,400,000 $hr^{-1}$, 1,500,000 $hr^{-1}$, 1,600,000 $hr^{-1}$, 1,700,000 $hr^{-1}$, 1,800,000 $hr^{-1}$, 1,900,000 $hr^{-1}$, or 2,000,000 $hr^{-1}$. In various embodiments, the space velocity of the flowing step is a range between any two space velocities listed above.

In various embodiments, the flowing of the nanoparticle agglomerates includes separating or filtering the nanoparticle agglomerates. The separating or filtering of the nanoparticle agglomerates of various embodiments can include separating/filtering the nanoparticle aggregates for a particle size or a particle size range, where the nanoparticle agglomerates having a size that is the particle size, larger or smaller than the particle size, or being within or outside the particle size range are either deposited to the porous filter substrate or not deposited to the porous filter substrate. In various embodiments, the particle size is 0.05 μm, 0.1 μm, 0.5 μm, 1 μm, 2 μm, 3 μm, 4 μm, 5 μm, 6 μm, 7 μm, 8 μm, 9 μm, 10 μm, 20 μm, 30 μm, 40 μm, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, or 200 μm. In various embodiments, the particle size range is a range between any two particle sizes listed above.

The following example illustrates methods of preparing a particulate filter of various embodiments from agglomerated nanoparticles. FIG. 12 shows a system 600 for preparing particulate filters 100, 100' from agglomerated nanoparticles 220. As shown in FIG. 12, the agglomerated nanoparticles 220 are combined with a carrier gas 612. The agglomerated nanoparticles 220 are flowed through tubing/piping 613 towards the porous filter substrate 101,101'. The agglomerated nanoparticles 220 are flowed through the porous filter substrate 101,101', where a nanoparticle concentration is deposited to the porous filter substrate 101,101'. Before reaching the porous filter substrate 101,101', the agglomerated nanoparticles 220 can be also selected through an aerosol separator. Selection with the aerosol separator allows for the selection of agglomerated nanoparticles with desirable sizes. Examples of aerosol separators include a cyclone separator or an impactor. Agglomerated nanoparticles 220 that are not deposited on the porous filter substrate 101,101' can be flowed through 615 the porous filter substrate 101,101' and collected 616. In one example, a fluidized-bed aerosol generator was used to suspend alumina powder prepared from flame pyrolysis synthesis. The agglomerated nanoparticles were suspended in a carrier gas and flowed through a porous filter substrate to deposit the agglomerates to the substrate. In various embodiments, the nanoparticle had a particle size ranging from 5 nm to 50 nm and the agglomerate size had a range from 1 μm to 20 μm. In other embodiments, the agglomerates had a median particle size range from 0.05 μm to 200 μm and the nanoparticles had a median particle size ranging from 1 nm to 500 nm. In various embodiments, the agglomerates have high porosity (e.g. 70% or more). The space velocity can range from 100 hr$^{-1}$ to 2,000,000 hr$^{-1}$.

Figure 13:
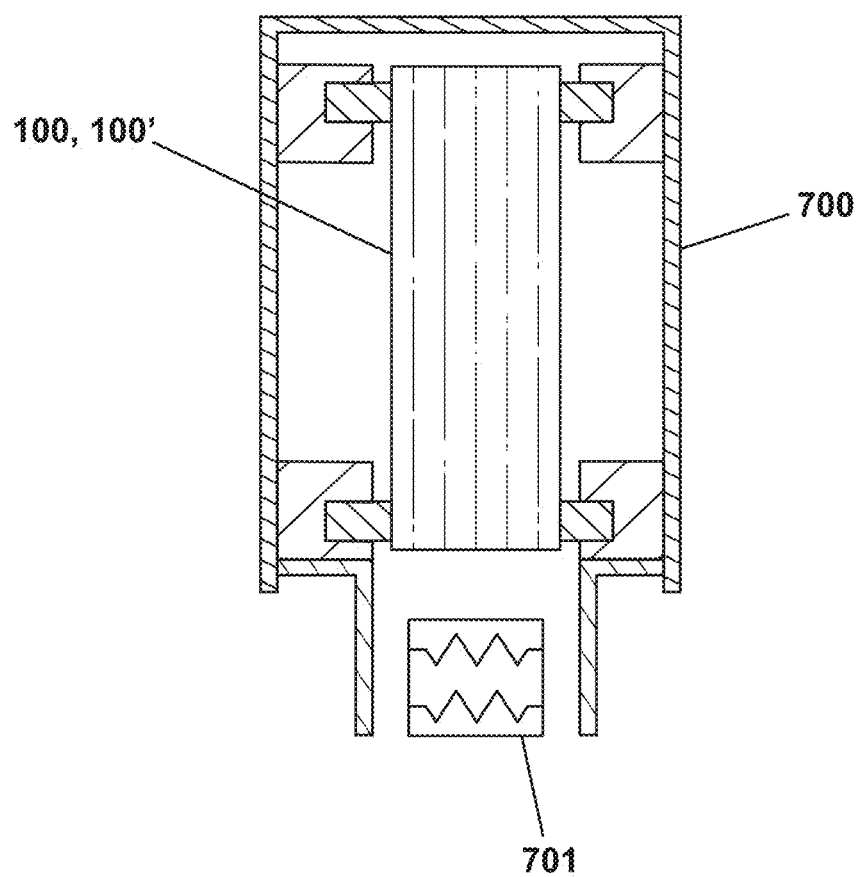
FIG. 13 shows a particulate filter of various embodiments calcinating in a furnace.

In various embodiments, the methods further include, after the flowing, calcining the porous filter substrate/particulate filter. In various embodiments, the calcining includes substantially simultaneously or simultaneously a plurality of porous filter substrates/particulate filters. As shown in FIG. 13, a particulate filter 100, 100' is calcined in a calcining furnace 700, where the particulate filter 100, 100' is heated with a heating element 701. In this example, the particulate filters with nanoparticles were heat treated. The heat treatment can bind the nanoparticles and also converts the particles to a desirable phase. Alternatively, the calcination of the porous filter substrate/particulate filter can be accomplished on a larger scale where multiple porous filter substrates/particulate filters are calcined in a large furnace or a conveyor belt furnace. In these examples, the nanoparticles converted from boehmite to γ-alumina. In another example, the heat treatment was conducted in air with water vapor to facilitate bonding between particles. In various embodiments, the calcining temperature is 500° C., 550° C., 600° C., 650° C., 700° C., 750° C., 800° C., 850° C., 900° C., 950° C., 1000° C., 1050° C., 1100° C., 1150° C., or 1200° C. The calcining temperature of various embodiments is a range between any two temperatures listed above. In various embodiments, the water vapor concentration during calcination is 0%, 1%, 2%, 3%, 4%, 5%, 6%, 7%, 8%, 9%, 10%, 11%, 12%, 13%, 14%, 15%, 16%, 17%, 18%, 19%, or 20%. The water vapor concentration of various embodiments is a range between any two percentages listed above.

Figure 14:
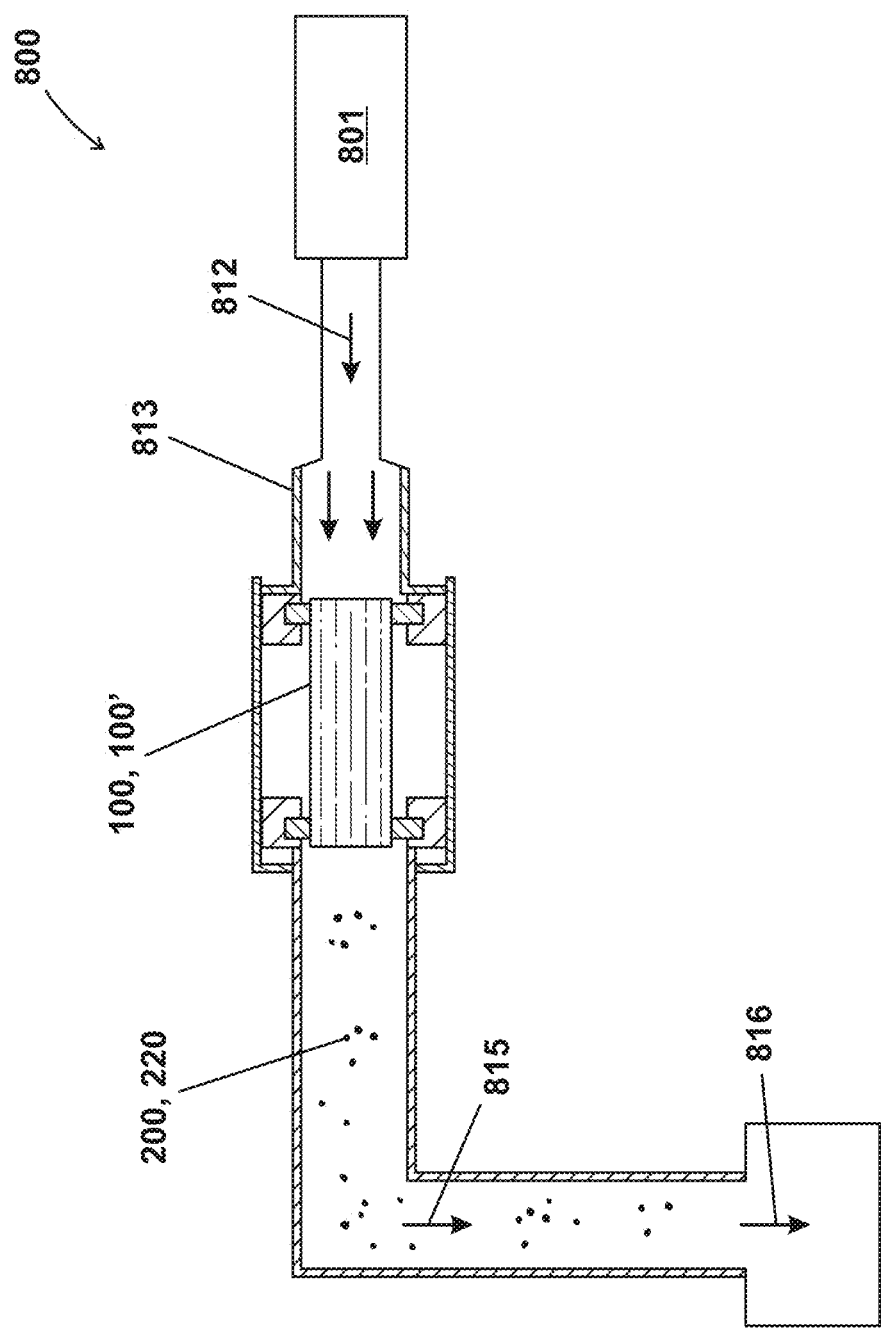
FIG. 14 shows a system of various embodiments for removing unstable nanoparticles or agglomerated nanoparticles from a porous filter substrate.

In various embodiments, the methods further include, after the flowing, directing a flow of a medium to dislodge nanoparticles from a particulate filter. FIG. 14 shows a system 800 for dislodging nanoparticles 200 or nanoparticle agglomerates from a particulate filter 100, 100', where a gas or liquid 812 such as the carrier gas of any embodiment is flown from a source 801 and through piping/tubing 813 and the particulate filter 100, 100'. Any nanoparticles 200 or nanoparticle agglomerates 220 that were unstably deposited to the porous filter substrate 101,101' are removed 815 and collected 816. In one example, the filters with collected nanoparticles are treated with high flow (up to 3×10$^6$ hr$^{-1}$ space velocity). The flow allows removal of unstable particle agglomerates.

In various embodiments, the space velocity to remove unstable nanoparticles or nanoparticle aggregates is 10 hr$^{-1}$, 50 hr$^{-1}$, 100 hr$^{-1}$, 200 hr$^{-1}$, 300 hr$^{-1}$, 400 hr$^{-1}$, 500 hr$^{-1}$, 600 hr$^{-1}$, 700 hr$^{-1}$, 800 hr$^{-1}$, 900 hr$^{-1}$, 1,000 hr$^{-1}$, 5000 hr$^{-1}$, 10,000 hr$^{-1}$, 20,000 hr$^{-1}$, 30,000 hr$^{-1}$, 40,000 hr$^{-1}$, or 50,000 hr$^{-1}$, 100,000 hr$^{-1}$, 200,000 hr$^{-1}$, 300,000 hr$^{-1}$, 400,000 hr$^{-1}$, 500,000 hr$^{-1}$, 600,000 hr$^{-1}$, 700,000 hr$^{-1}$, 800,000 hr$^{-1}$, 900,000 hr$^{-1}$, 1,000,000 hr$^{-1}$, 1,100,000 hr$^{-1}$, 1,200,000 hr$^{-1}$, 1,300,000 hr$^{-1}$, 1,400,000 hr$^{-1}$, 1,500,000 hr$^{-1}$, 1,600,000 hr$^{-1}$, 1,700,000 hr$^{-1}$, 1,800,000 hr$^{-1}$, 1,900,000 hr$^{-1}$, or 2,000,000 hr$^{-1}$, 2,000,000 hr$^{-1}$, 2,100,000 hr$^{-1}$, 2,200,000 hr$^{-1}$, 2,300,000 hr$^{-1}$, 2,400,000 hr$^{-1}$, 2,500,000 hr$^{-1}$, 2,600,000 hr$^{-1}$, 2,700,000 hr$^{-1}$, 2,800,000 hr$^{-1}$, 2,900,000 hr$^{-1}$, or 3,000,000 hr$^{-1}$. In various embodiments, the space velocity of the flowing step is a range between any two space velocities listed above.

Figure 15B:
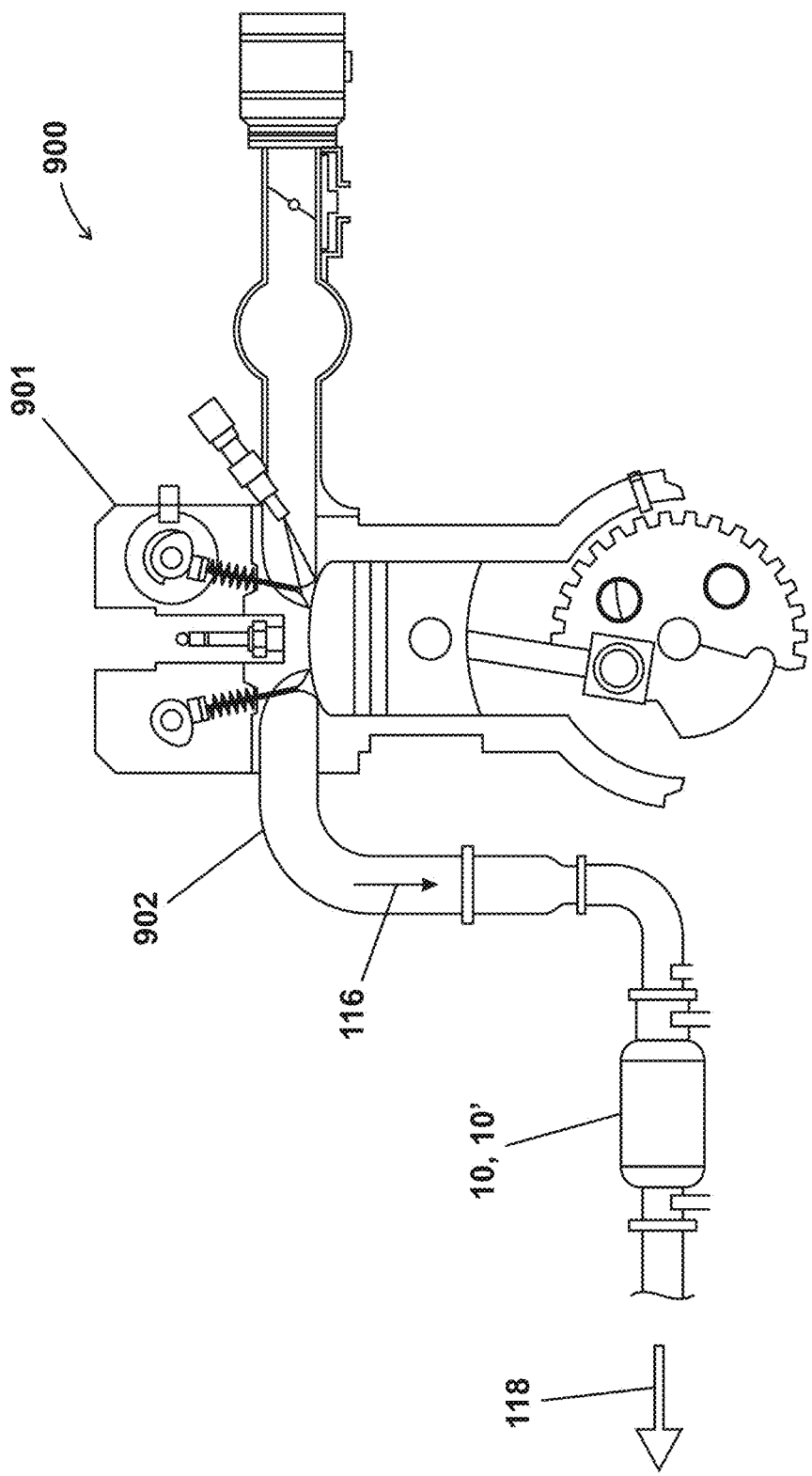

In various embodiments are disclosed internal combustion engine systems or vehicles including an internal combustion engine and an engine exhaust particulate filter of any embodiment configured to receive an exhaust gas stream from the internal combustion engine. FIG. 15A shows an internal combustion engine system 900 within a motorized vehicle 903. As shown in FIG. 15B, the internal combustion engine system 900 includes an internal combustion engine coupled to a particulate filter system 10, 10'. In various embodiments, the internal combustion engine is a GDI or direct injection diesel engine.

In various embodiments are disclosed methods for filtering particulates from an exhaust gas stream including directing an exhaust gas stream from an internal combustion engine through an engine exhaust particulate filter of any embodiment, where the engine exhaust particulate filter removes particulates from the exhaust gas stream. As shown in FIGS. 15A and 15B, particulate filter system 10, 10' receives exhaust with particulates 116 via tubing or piping 902, where the particulate filter system 10, 10' removes the particulates from the exhaust 116. The filter exhaust 118 then exits the particulate filter system 10, 10'.

The advantages of particulate filters of various embodiments include, for example: controllable and efficient improvement of green filtration efficiency (zero mileage efficiency); capable of achieving 80+% green filtration efficiency; low backpressure penalty; and low loading of coating material compared with other coating technology such as washcoating. The following reference is incorporated in its entirety by reference: Lambert, Christine, et al. "Gasoline Particle Filter Development." Emission Control Science and Technology 3.1 (2017): 105-111.

In various embodiments, the particulate filter has a particulate filtration efficiency greater than an otherwise identical particulate filter devoid of the nanoparticle concentration.

In various embodiments, the particulate filter has a particulate filtration efficiency of 50% or more for particulates with 1 μm or less particles sizes. The particulate filter has a particulate filtration efficiency of 50%, 55%, 60%, 65%, 70%, 75%, 80%, 85%, 90%, 95%, 99%, or 100%. In various embodiments, the particulate filtration efficiency is a range between any two particulate filtration efficiencies listed above. In various embodiments, particulate filtration efficiency relates to the filtration of particulates having a particle size of 5 nm, 10 nm, 30 nm, 40 nm, 70 nm, 80 nm, 90 nm, 100 nm, 130 nm, 180 nm, 230 nm, 250 nm, 280 nm, 300 nm, 500 nm, 750 nm, 900 nm, 950 nm, 975 nm, or 1000 nm. In various embodiments, the particle size of the particulates is a range between any two particle sizes listed above.

In various embodiments, the particulate filter has a backpressure at a flow rate that is at most 50% greater than a backpressure at the flow rate of an otherwise identical particulate filter devoid of the nanoparticle concentration. The particulate filter of various embodiments has a backpressure at a flow rate of 0%, 0.001%, 0.1%, 1%, 5%, 10%, 20%, 30%, 40%, or 50% greater than an otherwise identical particulate filter devoid of the nanoparticle concentration. In various embodiments, the increase in backpressure is a range between any two percentages listed above.

In various embodiments, the particulate filter has a backpressure at a flow rate that is at most equal to a backpressure at the flow rate of a particulate filter with a 3.5 g/in$^3$ or less washcoat loading. In various embodiments, the back pressures at the flow rate is 0%, 5%, 10%, 15%, 20%, 25%, 30%, 35%, 40%, 45%, 50%, 55%, 60%, 65%, 70%, 75%, 80%, 85%, 90%, 95%, 100%, 200%, 300%, 400%, or 500% less than a backpressure at the flow rate of a particulate filter with a 3.5 g/in$^3$ or less washcoat loading. In various embodiments, the decrease in backpressure is a range between any two percentages.

In various embodiments, the wash coat loading is 0.01 g/in$^3$, 0.1 g/in$^3$, 0.5 g/in$^3$, 1 g/in$^3$, 1.5 g/in$^3$, 2 g/in$^3$, 2.5 g/in$^3$, 3 g/in$^3$, or 3.5 g/in$^3$. In various embodiments, the washcoat loading is a range between any two concentrations listed above.

Figure 16:
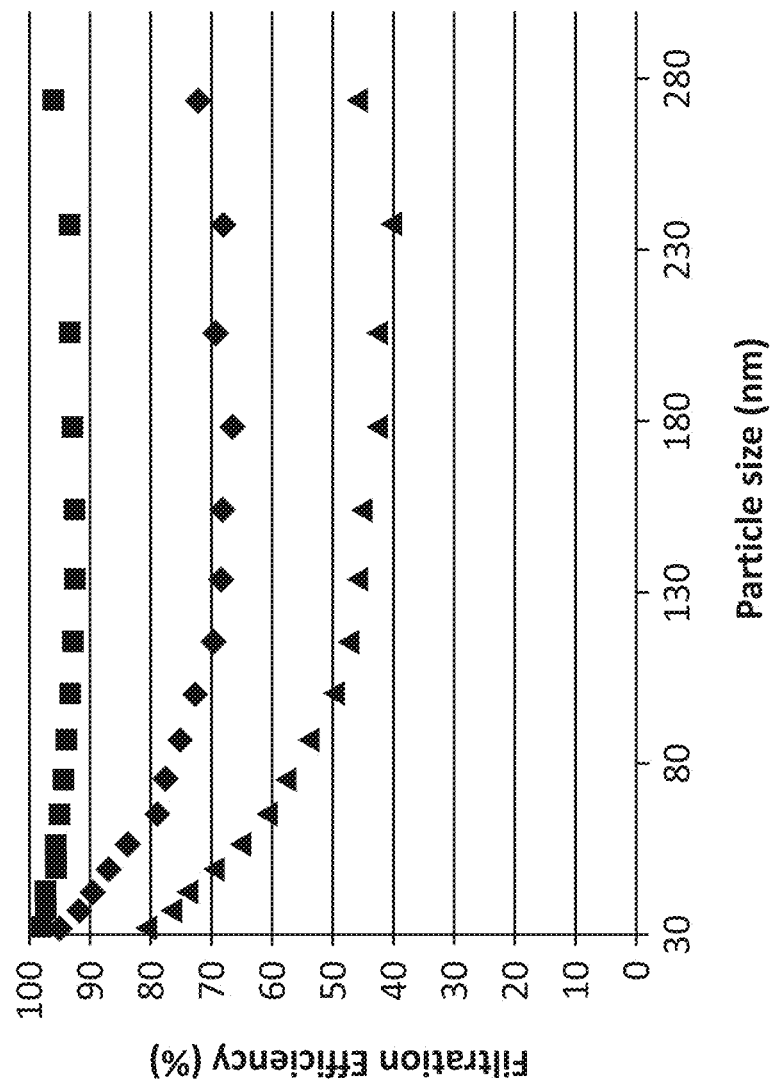
FIGS. 16 and 17 are graphs comparing the particulate filtration efficiencies of particulate filters with nanoparticles of various embodiments to particulate filters without nanoparticles.
Figure 17:
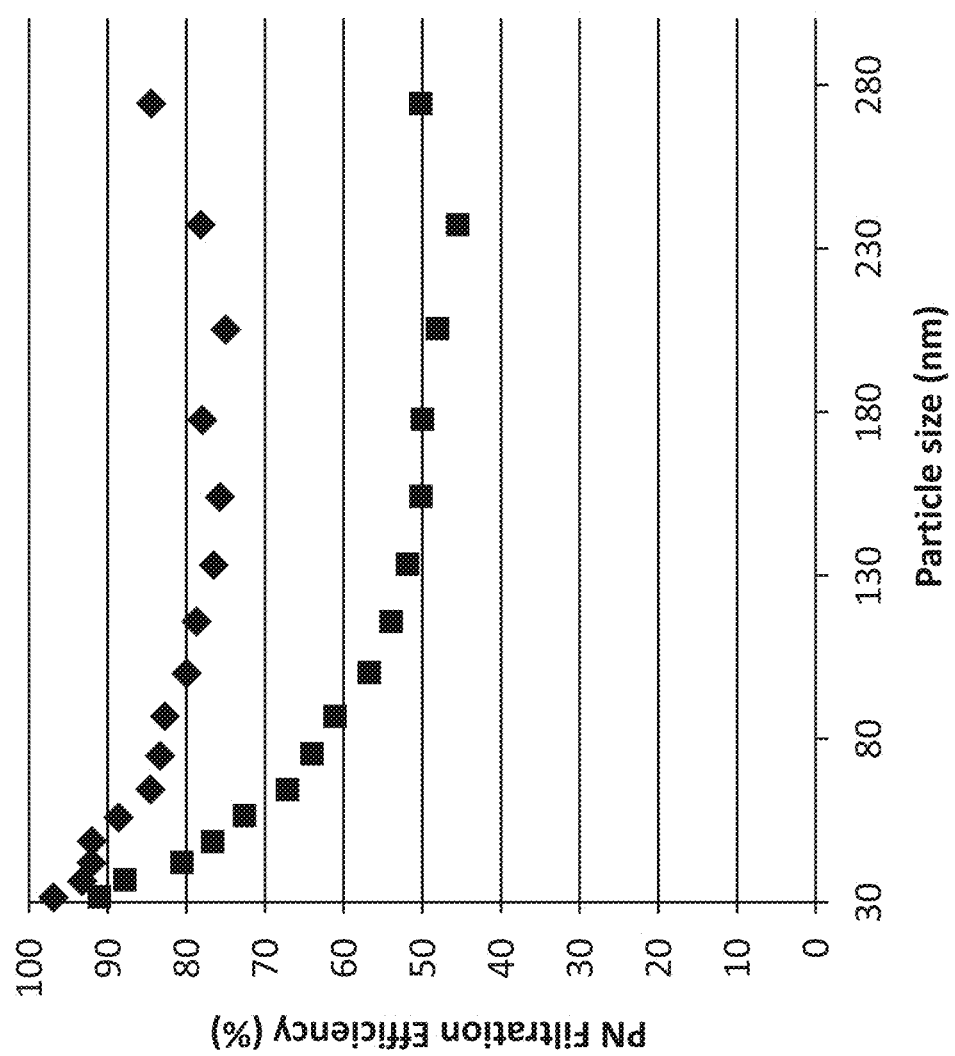

FIGS. 16 and 17 are graphs comparing the particulate filtration efficiencies of different concentrations of nanoparticles deposited to the porous walls of filter substrates to filter substrates devoid of particles. For FIG. 16: "■" are substrates coated with ~5 g/L γ-alumina nanoparticles, "♦" are substrates coated with ~1 g/L γ-alumina nanoparticles; and "▲" are bare substrates. For FIG. 17: "■" are bare substrates and "♦" are substrates coated nanoparticles. As shown in FIG. 16, the addition of the particles to the filter substrate improved filtration of particulates having particle sizes ranging from less than 30 nm to 300 nm. FIG. 17 further shows a significant increase in filtration efficiency for all soot particles.

Figure 18:
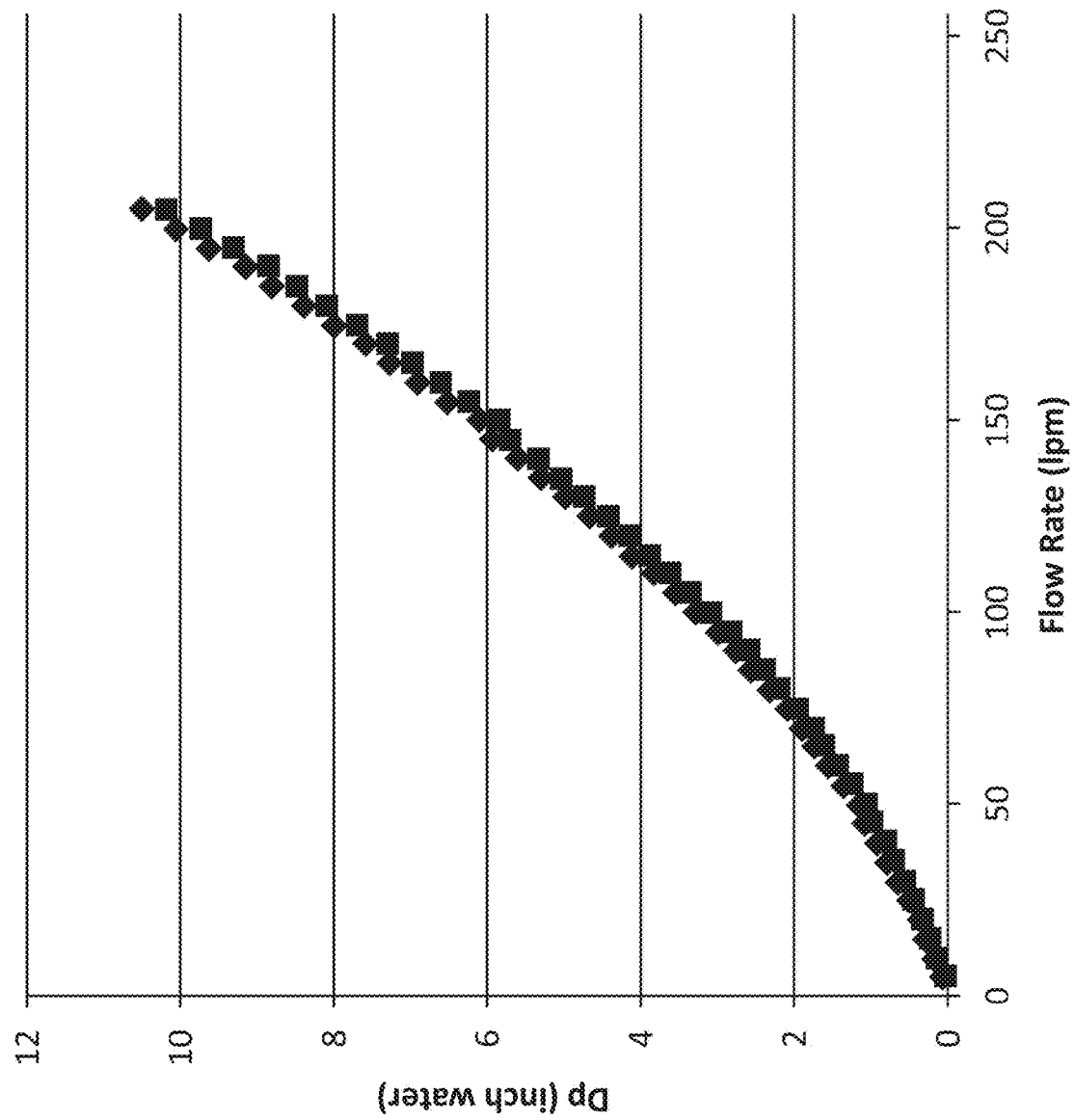
FIG. 18 is a graph comparing the change in backpressure of particulate filters with nanoparticles of various embodiments to particulate filters without nanoparticles.

FIG. 18 is a graph showing changes in backpressure (Dp) with or without nanoparticles. For FIG. 18: "■" are bare substrates and "♦" are substrates with nanoparticles. As shown in FIG. 18, the addition of nanoparticles had a minor backpressure increase on the particulate filter.

The following examples illustrate the various embodiments of the present disclosure. Those skilled in the art will recognize many variations that are within the spirit of the present disclosure and scope of the claims.

Particulate Efficiency and Backpressure Effect on GDI Engines

Figure 19:
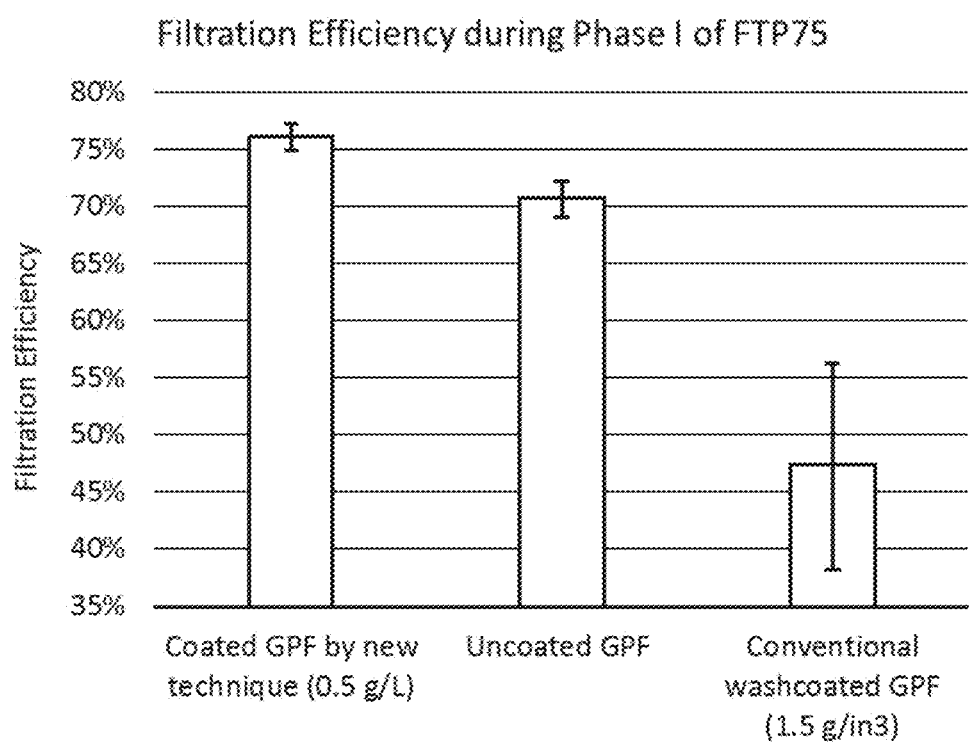
FIGS. 19 and 22 are graphs comparing the particulate filtration efficiencies of particulate filters with nanoparticles of various embodiments to particulate filters without nanoparticles and particulate filters with conventional washcoats.
Figure 20:
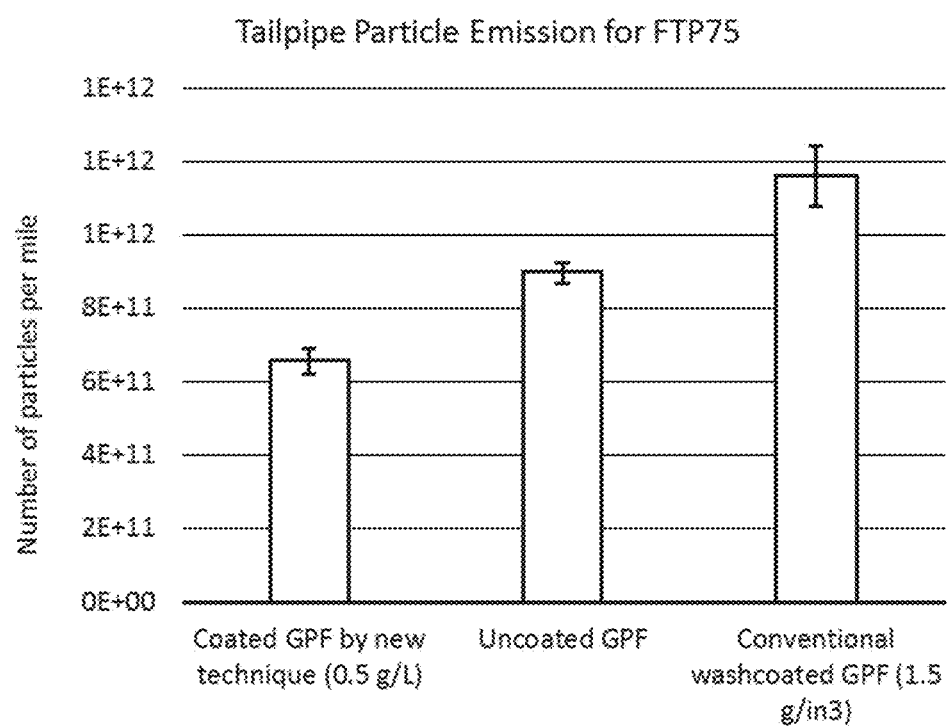
FIGS. 20 and 23 are graphs comparing the particulate emissions of particulate filters with nanoparticles of various embodiments to particulate filters without nanoparticles and particulate filters with conventional washcoats.
Figure 21:
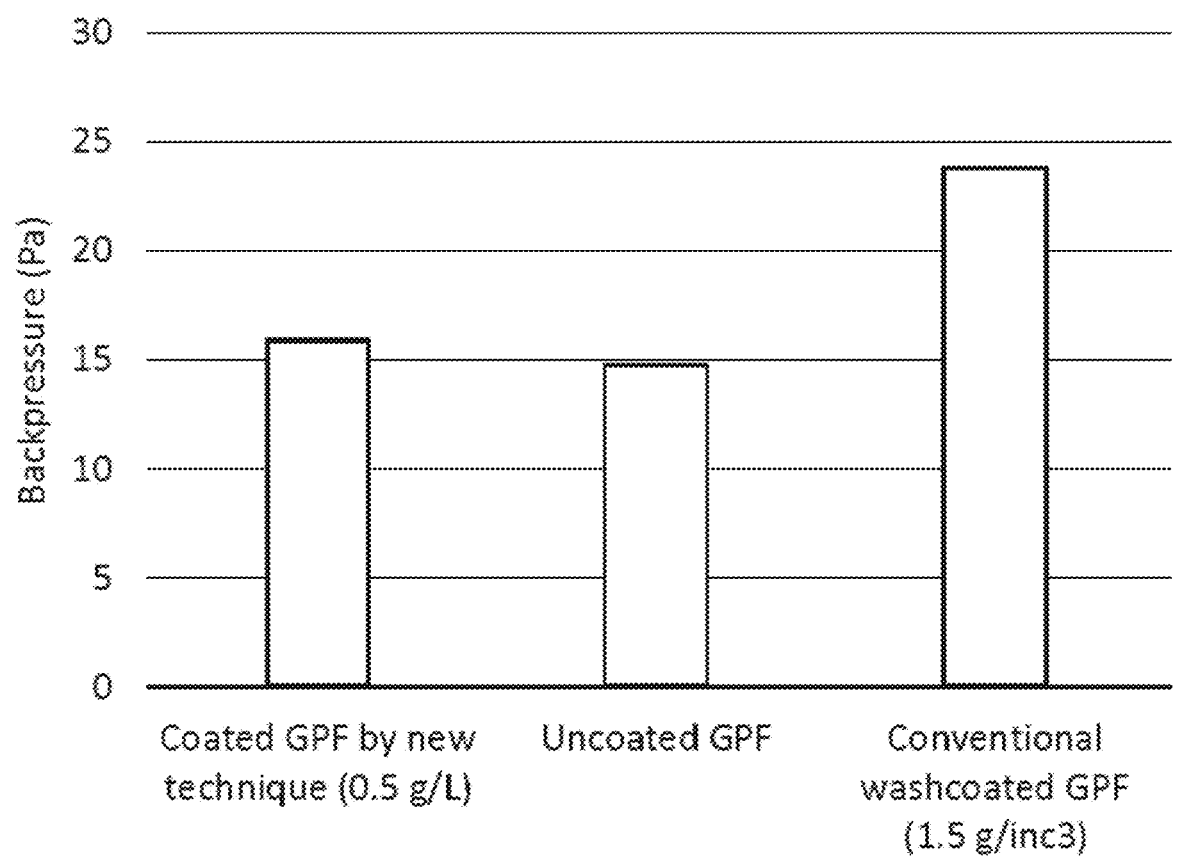
FIGS. 21 and 24 are graphs comparing the calculated backpressures of particulate filters with nanoparticles of various embodiments to particulate filters without nanoparticles and particulate filters with conventional washcoats.

In one example, a 2.0 L GTDI engine was equipped with different GPFs and tested with FTP75 cycle respectively. FIG. 19 shows the filtration efficiencies determined from the soot concentrations before and after the filter. Coating the filter with ~0.5 g/L fine particles using current technique showed improved filtration efficiency than the uncoated filter, whereas coating the filter using conventional washcoating technique at much higher loading level~1.5 g/in$^3$ showed negative impact on efficiency. As shown in FIG. 20, the total particle emission at the tailpipe was significantly lower for the coated GPF by the disclosed technique. FIG. 21 further shows that the backpressure at rated power was predicated by measured permeability and that the coated GPF by the new technique showed a slight increase in backpressure (~8%), which was much less than the backpressure increase with conventional washcoated GPF (~60%).

Figure 22:
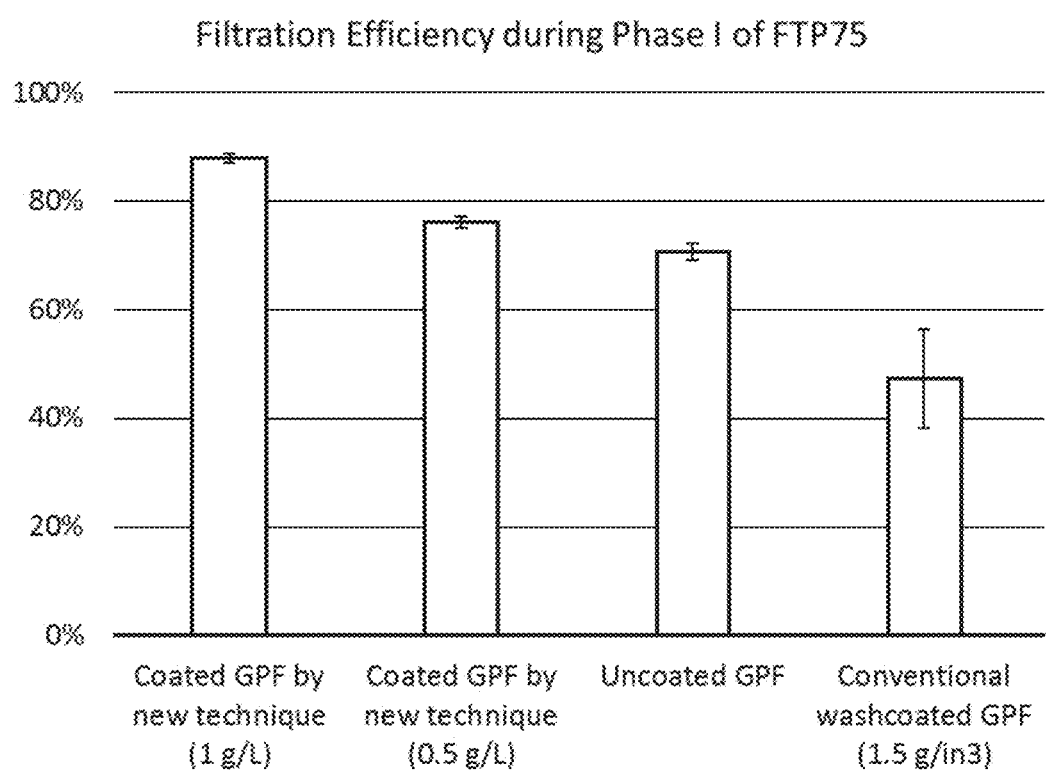
Figure 23:
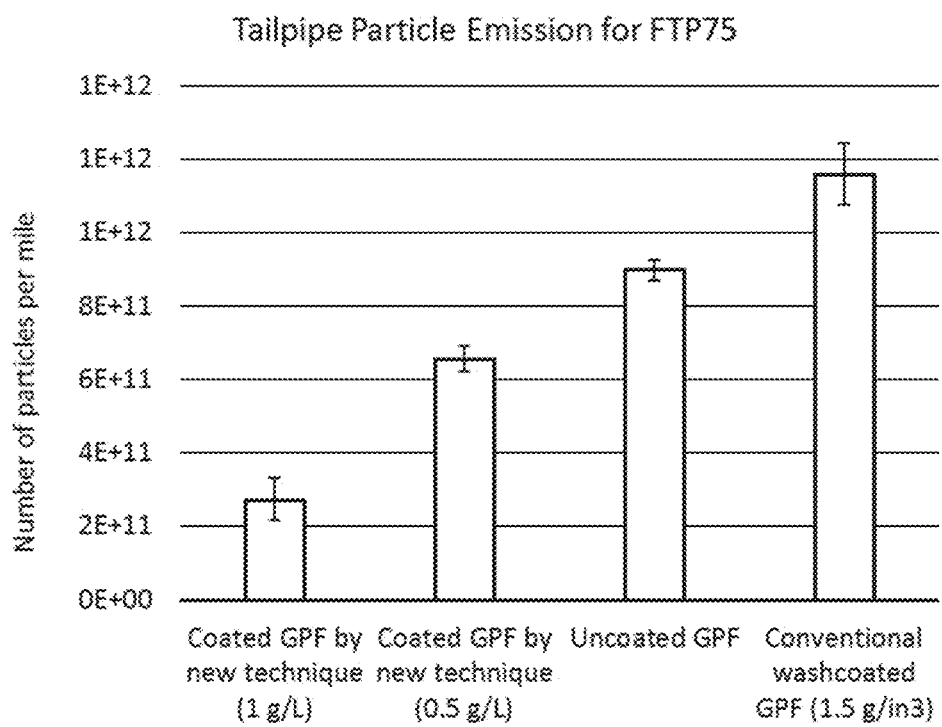
Figure 24:
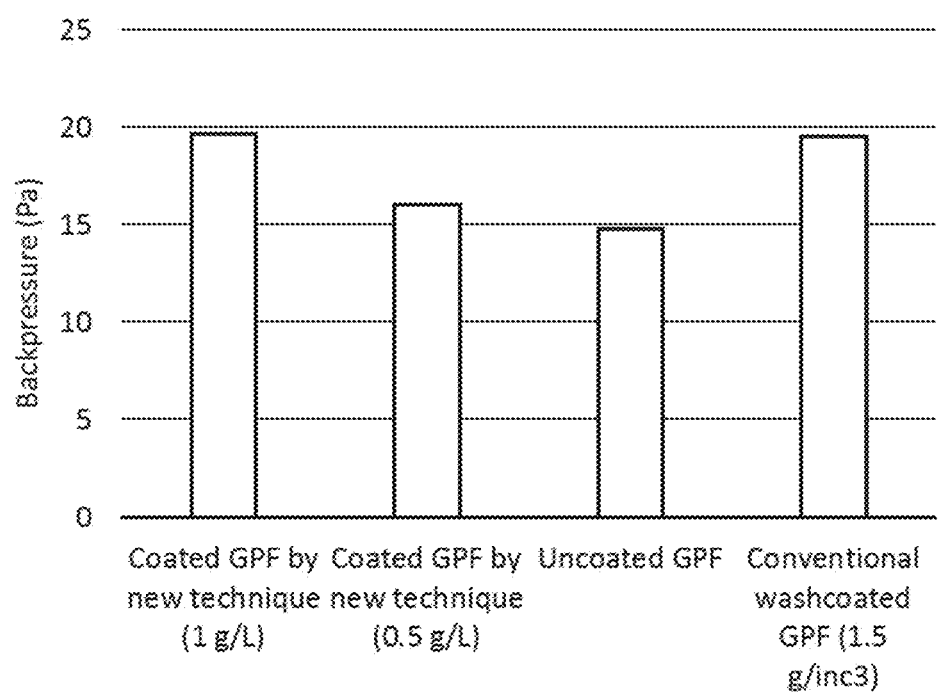

In another example, a 2.0 L GTDI engine was equipped with different GPFs and tested with FTP75 cycle respectively. FIG. 21 shows the filtration efficiencies determined from the soot concentrations before and after the filter during the Phase I in FTP 75 cycle. Filters coated with nanoparticles with the disclosed technique show higher filtration efficiency. The improvement also increases with the particle loading. With ~1 g/L loading using new technique, the efficiency reaches 88%. In contrast, coating the filter using conventional washcoating technique showed negative impact on efficiency even at much higher loading level~1.5 g/in$^3$. As shown in FIG. 22, the total particle emission at the tailpipe was significantly lower for the coated GPFs by the disclosed technique. FIG. 23 further shows that the backpressure at rated power was predicated by measured permeability and that the coated GPF with fine particles showed less or comparable backpressure than the conventional coated GPF.

While exemplary embodiments are described above, it is not intended that these embodiments describe all possible forms of the present disclosure as disclosed in various embodiments. Rather, the words used in the specification are words of description rather than limitation, and it is understood that various changes may be made without departing from the spirit and scope of the present disclosure as disclosed in various embodiments. Additionally, the features of various implementing embodiments may be combined to form further embodiments of the present disclosure as disclosed in various embodiments.

What is claimed is:

1. An engine exhaust particulate filter comprising:
a porous substrate having thereon inert nanoparticles at a concentration ranging from 0.01 g/L to 60 g/L relative to a filter volume of the substrate, a portion of the nanoparticles being configured to remain attached during regeneration and form regeneration resistant porous structures that capture particulates from an exhaust gas stream, wherein the engine exhaust particulate filter has a backpressure at a flow rate that is at most equal to a backpressure at the flow rate of an engine exhaust particulate filter with a 3.5 g/in$^3$ or less washcoat loading.

2. The engine exhaust particulate filter of claim 1, wherein some of the structures are disposed within pores of the substrate.

3. The engine exhaust particulate filter of claim 1, wherein the structures have porosities of 70% or more.

4. The engine exhaust particulate filter of claim 1, wherein the nanoparticles include metal.

5. The engine exhaust particulate filter of claim 1, wherein the nanoparticles include metal oxide.

6. The engine exhaust particulate filter of claim 1, wherein some of the structures include catalyst nanoparticles.

7. The engine exhaust particulate filter of claim 1, wherein the engine exhaust particulate filter has a particulate filtration efficiency greater than an otherwise same engine exhaust particulate filter devoid of the nanoparticles.

8. The engine exhaust particulate filter of claim 1, wherein the engine exhaust particulate filter has a particulate filtration efficiency of 50% or more for particulates with 1 µm or less particle size.

9. An engine exhaust particulate filter comprising:
a porous substrate having thereon a concentration of inert nanoparticles ranging from 0.01 g/L to 60 g/L relative to a filter volume of the substrate, wherein a portion of the inert nanoparticles configured to remain attached during regeneration of the substrate is effective to capture particulates from an exhaust gas stream, wherein the engine exhaust particulate filter has a backpressure at a flow rate that is at most equal to a backpressure at the flow rate of an engine exhaust particulate filter with a 3.5 g/in$^3$ or less washcoat loading.

10. The engine exhaust particulate filter of claim 9, wherein the nanoparticles include metal.

11. The engine exhaust particulate filter of claim 9, wherein the nanoparticles include metal oxide.

12. The engine exhaust particulate filter of claim 9, wherein the substrate further has thereon catalytic nanoparticles.

13. The engine exhaust particulate filter of claim 9, wherein the engine exhaust particulate filter has a particulate filtration efficiency greater than an otherwise same engine exhaust particulate filter devoid of the nanoparticles.

14. The particulate filter of claim 9, wherein the particulate filter has a particulate filtration efficiency of 50% or more for particulates with 1 µm or less particle size.

\* \* \* \* \*